(12) United States Patent
Akana et al.

(10) Patent No.: US 11,172,110 B2
(45) Date of Patent: Nov. 9, 2021

(54) PORTABLE ELECTRONIC DEVICE

(71) Applicant: Apple Inc., Cupertino, CA (US)

(72) Inventors: Jody R. Akana, San Francisco, CA (US); Molly Anderson, San Francisco, CA (US); Bartley K. Andre, Palo Alto, CA (US); Shota Aoyagi, San Francisco, CA (US); Anthony Michael Ashcroft, San Francisco, CA (US); Marine C. Bataille, San Francisco, CA (US); Jeremy Bataillou, San Francisco, CA (US); Markus Diebel, San Francisco, CA (US); M. Evans Hankey, San Francisco, CA (US); Julian Hoenig, San Francisco, CA (US); Richard P. Howarth, San Francisco, CA (US); Jonathan P. Ive, San Francisco, CA (US); Julian Jaede, San Francisco, CA (US); Duncan Robert Kerr, San Francisco, CA (US); Peter Russell-Clarke, San Francisco, CA (US); Benjamin Andrew Shaffer, San Francisco, CA (US); Mikael Silvanto, San Francisco, CA (US); Sung Ho Tan, San Francisco, CA (US); Clement Tissandier, San Francisco, CA (US); Eugene Antony Whang, San Francisco, CA (US); Rico Zörkendörfer, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/586,736

(22) Filed: Sep. 27, 2019

(65) Prior Publication Data

US 2020/0221002 A1 Jul. 9, 2020

Related U.S. Application Data

(63) Continuation-in-part of application No. 29/683,766, filed on Mar. 15, 2019, and a continuation-in-part of
(Continued)

(51) Int. Cl.
*H04M 1/02* (2006.01)
*H04M 1/72* (2021.01)
(Continued)

(52) U.S. Cl.
CPC ........ *H04N 5/2257* (2013.01); *H04M 1/0264* (2013.01); *H04N 5/247* (2013.01)

(58) Field of Classification Search
None
See application file for complete search history.

(56) References Cited

U.S. PATENT DOCUMENTS

D337,569 S 7/1993 Kando
D420,354 S 2/2000 Morales
(Continued)

FOREIGN PATENT DOCUMENTS

CN 300928488 S 5/2009
CN 301134880 S 2/2010
(Continued)

OTHER PUBLICATIONS

Apple iPhone 5 pictures, as posted at GsmArena.com [online], [retrieved on Apr. 27, 2017]. Available on the Internet, (URL: http://www.gsmarena.com/apple_iphone_S-pictures-491O.php#image15), accessed on Sep. 2012.
(Continued)

*Primary Examiner* — Pablo N Tran
(74) *Attorney, Agent, or Firm* — Dorsey & Whitney LLP

(57) ABSTRACT

According to some embodiments, a portable electronic device is described. The portable electronic device includes
(Continued)

a housing member defining an external sidewall, a first glass cover and a second glass cover, where the second glass cover includes a first region having a first exterior surface, a second region having a second exterior surface vertically displaced from the first exterior surface, where the second region includes a first opening, a second opening, and a third opening, and a transition region having an exterior surface that extends between the first exterior surface to the second exterior surface. The portable electronic device further includes a first camera module disposed within the first opening, a second camera module disposed within the second opening, a strobe module disposed within the third opening, and a trim structure having an edge that overlays the second region of the second glass cover.

7 Claims, 23 Drawing Sheets

Related U.S. Application Data application No. 29/676,128, filed on Jan. 8, 2019, and a continuation-in-part of application No. 29/676,127, filed on Jan. 8, 2019.

(60) Provisional application No. 62/897,901, filed on Sep. 9, 2019.

(51) Int. Cl.
    *H04N 5/232*     (2006.01)
    *G06F 1/16*     (2006.01)
    *H04N 5/225*     (2006.01)
    *H04N 5/247*     (2006.01)

(56) References Cited

U.S. PATENT DOCUMENTS

| | | |
|---|---|---|
| D504,889 S | 5/2005 | Andre et al. |
| D548,732 S | 8/2007 | Cebe et al. |
| D558,756 S | 1/2008 | Andre et al. |
| D558,757 S | 1/2008 | Andre et al. |
| D558,758 S | 1/2008 | Andre et al. |
| D573,143 S | 7/2008 | Park et al. |
| D580,387 S | 11/2008 | Andre et al. |
| D597,067 S | 7/2009 | Oh et al. |
| D599,342 S | 9/2009 | Andre et al. |
| D600,241 S | 9/2009 | Andre et al. |
| D602,014 S | 10/2009 | Andre et al. |
| D602,015 S | 10/2009 | Andre et al. |
| D602,017 S | 10/2009 | Andre et al. |
| D602,488 S | 10/2009 | Jiang et al. |
| D603,834 S | 11/2009 | Lyman et al. |
| D604,297 S | 11/2009 | Andre et al. |
| D608,750 S | 1/2010 | He et al. |
| D613,736 S | 4/2010 | Andre et al. |
| 7,697,281 B2 | 4/2010 | Dabov et al. |
| D618,204 S | 6/2010 | Andre et al. |
| D619,555 S | 7/2010 | Yang et al. |
| D622,270 S | 8/2010 | Andre et al. |
| D622,718 S | 8/2010 | Andre et al. |
| D622,719 S | 8/2010 | Andre et al. |
| D625,307 S | 10/2010 | Cheng |
| D626,937 S | 11/2010 | Yeo et al. |
| D627,344 S | 11/2010 | Chien et al. |
| D627,769 S | 11/2010 | Kumagai |
| D627,778 S | 11/2010 | Akana et al. |
| D631,028 S | 1/2011 | Park et al. |
| D631,458 S | 1/2011 | Liao et al. |
| D633,461 S | 3/2011 | Kim et al. |
| D633,493 S | 3/2011 | Akana et al. |
| D633,908 S | 3/2011 | Akana et al. |
| D635,113 S | 3/2011 | Park et al. |
| D635,952 S | 4/2011 | Park et al. |
| D636,390 S | 4/2011 | Andre et al. |
| D636,392 S | 4/2011 | Akana et al. |
| D636,752 S | 4/2011 | Liao et al. |
| D638,003 S | 5/2011 | Chen |
| D638,815 S | 5/2011 | Lee et al. |
| D639,261 S | 6/2011 | Garnham |
| D639,763 S | 6/2011 | Kim et al. |
| D639,771 S | 6/2011 | Chen |
| D640,663 S | 6/2011 | Arnholt |
| D642,563 S | 8/2011 | Akana et al. |
| D648,303 S | 11/2011 | Park et al. |
| D649,968 S | 12/2011 | Li |
| D653,645 S | 2/2012 | Park |
| D654,887 S | 2/2012 | Mcmanigal et al. |
| D656,477 S | 3/2012 | et al. |
| D662,503 S | 6/2012 | Akana et al. |
| D668,627 S | 10/2012 | Chung |
| D671,905 S | 12/2012 | Mauritzson |
| D671,937 S | 12/2012 | Akana et al. |
| D672,343 S | 12/2012 | Akana et al. |
| D673,562 S | 1/2013 | Johnson |
| D676,432 S | 2/2013 | Hasbrook et al. |
| D676,477 S | 2/2013 | Chen et al. |
| D677,641 S | 3/2013 | Sutherland |
| D677,642 S | 3/2013 | Park |
| D677,657 S | 3/2013 | Akana et al. |
| D680,092 S | 4/2013 | Tsai et al. |
| D680,984 S | 4/2013 | Harmon et al. |
| D680,995 S | 4/2013 | Lee |
| D681,032 S | 4/2013 | Akana et al. |
| D681,632 S | 5/2013 | Akana et al. |
| D683,711 S | 6/2013 | Hofer et al. |
| D684,571 S | 6/2013 | Akana et al. |
| D686,586 S | 7/2013 | Cho et al. |
| D687,404 S | 8/2013 | Yoshimura |
| D687,793 S | 8/2013 | Park |
| D688,218 S | 8/2013 | Lee |
| D688,221 S | 8/2013 | Zuffo et al. |
| D688,660 S | 8/2013 | Akana et al. |
| D689,455 S | 9/2013 | Daniel |
| 8,526,180 B2 | 9/2013 | Rayner |
| D690,693 S | 10/2013 | Akana et al. |
| D691,133 S | 10/2013 | Akana et al. |
| D692,881 S | 11/2013 | Akana et al. |
| D693,324 S | 11/2013 | Wang |
| D693,785 S | 11/2013 | Sutherland |
| D696,247 S | 12/2013 | Kim |
| D697,911 S | 1/2014 | Mcmanigal et al. |
| D698,770 S | 2/2014 | Park |
| D698,773 S | 2/2014 | Wildner |
| 8,640,868 B2 | 2/2014 | O'dowd et al. |
| D702,219 S | 4/2014 | Suk |
| D705,188 S | 5/2014 | Chau et al. |
| D706,235 S | 6/2014 | Kim |
| D706,251 S | 6/2014 | Park |
| D706,301 S | 6/2014 | Akana et al. |
| D706,776 S | 6/2014 | Akana et al. |
| D707,223 S | 6/2014 | Akana et al. |
| D708,608 S | 7/2014 | Sugiyama et al. |
| D710,815 S | 8/2014 | Kim et al. |
| 8,804,353 B2 | 8/2014 | Montevirgen et al. |
| D712,384 S | 9/2014 | Hibi |
| D712,405 S | 9/2014 | Akana et al. |
| D713,833 S | 9/2014 | Wilkey |
| D718,268 S | 11/2014 | Wu et al. |
| 8,879,245 B2 | 11/2014 | Kim |
| D719,941 S | 12/2014 | Kim et al. |
| D720,747 S | 1/2015 | Kim et al. |
| D721,344 S | 1/2015 | Lee et al. |
| 8,933,347 B2 | 1/2015 | Kiple et al. |
| D724,572 S | 3/2015 | Wildner |
| 8,989,826 B1 | 3/2015 | Connolly |
| 9,031,393 B2 | 5/2015 | Zhang et al. |
| D731,481 S | 6/2015 | Akana et al. |
| D732,497 S | 6/2015 | Lee et al. |
| D732,539 S | 6/2015 | Akana et al. |
| D732,798 S | 6/2015 | Noyes Arnemann |
| D733,146 S | 6/2015 | Akana et al. |

(56) References Cited

U.S. PATENT DOCUMENTS

| | | |
|---|---|---|
| D736,205 S | 8/2015 | Park et al. |
| D739,391 S | 9/2015 | Chen et al. |
| D741,279 S | 10/2015 | Tai et al. |
| D742,351 S | 11/2015 | Chen et al. |
| D743,391 S | 11/2015 | Akana et al. |
| D744,993 S | 12/2015 | Diebel |
| D746,275 S | 12/2015 | Mohammad |
| D747,287 S | 1/2016 | Chang et al. |
| D749,563 S | 2/2016 | Akana et al. |
| 9,256,252 B2 | 2/2016 | Chao |
| D750,620 S | 3/2016 | Zhai |
| D750,729 S | 3/2016 | Sheikh et al. |
| D751,051 S | 3/2016 | Cho et al. |
| D752,010 S | 3/2016 | Kim |
| D752,037 S | 3/2016 | Akana et al. |
| 9,274,142 B2 | 3/2016 | Nickel et al. |
| D754,125 S | 4/2016 | Akana et al. |
| D759,008 S | 6/2016 | Akana et al. |
| D760,217 S | 6/2016 | Akana et al. |
| D761,226 S | 7/2016 | Poulin |
| D762,207 S | 7/2016 | Akana et al. |
| D762,610 S | 8/2016 | Joung et al. |
| D767,522 S | 9/2016 | Wu et al. |
| D769,208 S | 10/2016 | Ho et al. |
| 9,462,094 B2 | 10/2016 | Liu et al. |
| 9,469,469 B2 * | 10/2016 | Rayner .................. A45C 11/00 |
| 9,479,758 B2 * | 10/2016 | Woo ...................... H04N 13/254 |
| D770,411 S | 11/2016 | Zhang |
| D770,433 S | 11/2016 | Kangasmaa et al. |
| D771,607 S | 11/2016 | Kim |
| D771,622 S | 11/2016 | Akana et al. |
| D771,623 S | 11/2016 | Akana et al. |
| D772,865 S | 11/2016 | Akana et al. |
| D774,499 S | 12/2016 | Fathollahi |
| D777,700 S | 1/2017 | Kwon et al. |
| 9,537,219 B2 | 1/2017 | Ayala Vazquez et al. |
| D778,867 S | 2/2017 | Husgafvel et al. |
| D779,484 S | 2/2017 | Akana et al. |
| 9,577,318 B2 | 2/2017 | Pascolini et al. |
| D780,748 S | 3/2017 | Wang et al. |
| D781,807 S | 3/2017 | Hubbard et al. |
| 9,594,147 B2 | 3/2017 | Han et al. |
| D783,565 S | 4/2017 | Kim et al. |
| D783,566 S | 4/2017 | Kim et al. |
| D783,602 S | 4/2017 | Akana et al. |
| D784,314 S | 4/2017 | Ryu et al. |
| D784,315 S | 4/2017 | Ryu et al. |
| D786,229 S | 5/2017 | Kim et al. |
| 9,640,868 B2 | 5/2017 | Peng et al. |
| D790,535 S | 6/2017 | Akana et al. |
| D792,366 S | 7/2017 | Zhang et al. |
| D792,386 S | 7/2017 | Lee |
| D794,623 S | 8/2017 | Kwon et al. |
| D796,497 S | 9/2017 | Kim |
| 9,761,927 B2 | 9/2017 | Kasar et al. |
| D798,851 S | 10/2017 | Kim et al. |
| D798,852 S | 10/2017 | Kim et al. |
| D800,710 S | 10/2017 | Ryu et al. |
| D800,713 S | 10/2017 | Kim |
| D801,321 S | 10/2017 | Kim et al. |
| D803,209 S | 11/2017 | Akana et al. |
| D805,495 S | 12/2017 | Kester, Jr. et al. |
| D806,705 S | 1/2018 | Akana et al. |
| D810,715 S | 2/2018 | Cho et al. |
| D835,620 S | 12/2018 | Akana et al. |
| 10,425,561 B2 | 9/2019 | Jarvis et al. |
| 10,819,888 B2 * | 10/2020 | Xu ........................ H04N 5/2257 |
| 2008/0026626 A1 | 1/2008 | Ma |
| 2009/0247244 A1 | 10/2009 | Mittleman et al. |
| 2011/0050560 A1 | 3/2011 | Foster et al. |
| 2011/0117971 A1 | 5/2011 | Kim et al. |
| 2011/0255000 A1 * | 10/2011 | Weber .................... G03B 17/02 |
| | | 348/374 |
| 2011/0268218 A1 | 11/2011 | Kang et al. |
| 2012/0088555 A1 | 4/2012 | Hu |
| 2012/0168577 A1 | 7/2012 | Cheng |
| 2012/0170189 A1 | 7/2012 | Li et al. |
| 2012/0329535 A1 | 12/2012 | Kuo |
| 2013/0033581 A1 * | 2/2013 | Woo ....................... G06F 1/1626 |
| | | 348/47 |
| 2013/0222394 A1 * | 8/2013 | Fyke ...................... H04N 13/239 |
| | | 345/467 |
| 2013/0321237 A1 | 12/2013 | Woodhull |
| 2013/0331156 A1 | 12/2013 | Lui |
| 2014/0028902 A1 | 1/2014 | Sanford et al. |
| 2014/0063265 A1 * | 3/2014 | Shukla ................... H04N 5/225 |
| | | 348/187 |
| 2015/0198864 A1 * | 7/2015 | Havskjold ........... H04M 1/0264 |
| | | 455/556.1 |
| 2016/0191095 A1 | 6/2016 | Santelli |
| 2016/0277057 A1 | 9/2016 | Takahashi et al. |
| 2016/0381346 A1 | 12/2016 | Hsu et al. |
| 2017/0085764 A1 * | 3/2017 | Kim ................... H04N 5/23296 |
| 2017/0094222 A1 * | 3/2017 | Tangeland ............. H04N 7/147 |
| 2017/0104901 A1 * | 4/2017 | Sanford ............... H04N 5/2256 |
| 2018/0295292 A1 | 10/2018 | Lee et al. |
| 2019/0041909 A1 | 2/2019 | Pakula et al. |
| 2019/0082083 A1 | 3/2019 | Jarvis et al. |
| 2019/0082546 A1 | 3/2019 | Rammah et al. |
| 2019/0199907 A1 * | 6/2019 | Daulton ............... H04N 5/2254 |
| 2019/0238668 A1 | 8/2019 | Chen et al. |
| 2019/0317627 A1 * | 10/2019 | Kim ....................... G06F 3/045 |
| 2020/0265204 A1 * | 8/2020 | Lee ....................... G06K 9/0002 |
| 2020/0310489 A1 * | 10/2020 | Spraggs ................ G06F 1/1626 |
| 2020/0319682 A1 * | 10/2020 | Moon ................... G06F 1/1643 |

FOREIGN PATENT DOCUMENTS

| | | |
|---|---|---|
| CN | 301139661 S | 2/2010 |
| CN | 301161836 S | 3/2010 |
| CN | 301271887 S | 6/2010 |
| CN | 301300814 S | 8/2010 |
| CN | 301794564 S | 1/2012 |
| CN | 301867415 S | 3/2012 |
| CN | 302242618 S | 12/2012 |
| CN | 302268386 S | 1/2013 |
| CN | 302279529 S | 1/2013 |
| CN | 302321988 S | 2/2013 |
| CN | 302333118 S | 2/2013 |
| CN | 302350915 S | 3/2013 |
| CN | 302404040 S | 4/2013 |
| CN | 302430473 S | 5/2013 |
| CN | 202998218 U | 6/2013 |
| CN | 302455942 S | 6/2013 |
| CN | 302476338 S | 6/2013 |
| CN | 302560014 S | 9/2013 |
| CN | 302588771 S | 9/2013 |
| CN | 302606411 S | 10/2013 |
| CN | 302619300 S | 10/2013 |
| CN | 302748579 S | 2/2014 |
| CN | 302808732 S | 4/2014 |
| CN | 302873818 S | 7/2014 |
| CN | 302982246 S | 10/2014 |
| CN | 303000183 S | 11/2014 |
| CN | 303000194 S | 11/2014 |
| CN | 303617715 S | 3/2016 |
| CN | 303647864 S | 4/2016 |
| CN | 303774339 S | 8/2016 |
| CN | 303805687 S | 8/2016 |
| CN | 304095914 S | 4/2017 |
| CN | 304095915 S | 4/2017 |
| CN | 304130421 S | 5/2017 |
| CN | 303453788 S | 11/2017 |
| CN | 109510929 A | 3/2019 |
| DM | 095015 | 2/2017 |
| EM | 002088591-0001 | 8/2012 |
| EP | 3454541 A1 * | 3/2019 ........... H04N 5/2258 |
| IN | 210894-0001 | 6/2007 |
| IN | 210897-0001 | 6/2007 |
| IN | 2768570001 | 2/2016 |
| JP | 2008096494 A | 4/2008 |
| JP | D1326330 S | 4/2008 |
| JP | D1351277 S | 2/2009 |

(56) References Cited

FOREIGN PATENT DOCUMENTS

| | | | |
|---|---|---|---|
| JP | D1456810 S | 12/2012 | |
| JP | D1469635 S | 5/2013 | |
| JP | D1478342 S | 9/2013 | |
| JP | 1548987 S | 5/2016 | |
| JP | 2016122997 A | 7/2016 | |
| JP | 1563161 S | 11/2016 | |
| JP | 1574816 S | 4/2017 | |
| JP | D1600999 | 4/2018 | |
| KR | 300606828 | 7/2011 | |
| KR | 300849814 | 4/2016 | |
| KR | 300902453 | 9/2017 | |
| RU | 85816 U1 | 8/2009 | |
| RU | 89999 U1 | 12/2009 | |
| RU | 90363 U1 | 1/2010 | |
| RU | 104650 U1 | 5/2011 | |
| TW | D149042 S | 9/2012 | |
| TW | D169484 S | 8/2015 | |
| TW | D172231 S | 12/2015 | |
| WO | 080555 S | 2/2013 | |

OTHER PUBLICATIONS

Apple Iphone 7 and 7plus I New Camera, posted Sep. 8, 2016, [retrieved Aug. 28, 2017]. Retrieved from Internet, (URL: http://sujoyrdas.blogspot.com/2016/09/apple-iphone-7-and-7plus-newcamera.html).
ConceptsiPhone, "iPhone 8 and iPhone 8 Plus—Introducing" Youtube, Oct. 7, 2016, accessed at (https://www.youtube.com/watch?v=WSf8aJIYCjg).
Extended European Search Report for European Application No. 20153613.3, dated Jul. 24, 2020 (10 pp.).
Extended European Search Report for European Patent Application No. 20150572.4, dated Jul. 9, 2020 (7 pp.).
Identify you iPhone Model, Retrieved from the Internet URL: https://support. apple.com/enus/HT201296.
Apple iPhone 7 is here with a water resistant body, better cameras, 256GB capacity & no headphone jack, posted Sep. 8, 2016, [retrieved Aug. 28, 2017], Retrieved from Internet,, (URL: https://collindail.blogspot.com/2016/09/apple-iphone-7-is-here-withwater. html).
"All that glitters is not gold", Verykool Spark LTE SL5011 review: posted May 24, 2016, [retrieved Sep. 30, 2018]. Retrieved from Internet URL:https://www.androidguys.com/reviews/verykoolspark-lte-sl5011-review-all-that-glitters-is-not-gold.>.
"Hands-On With an iPhone 8 Dummy Model", posted Aug. 10, 2017, [retrieved Aug. 28, 2017], Retrieved from Internet, (URL https://www.youtube.com/watch?v=YuQUBhOAbUM).
"iPhone 6, Une Enieme Maquette Comparee Avec L'iPhone 5s", published May 3, 2014, accessed at http://www.nowhereelse.fr/iphone-6-maquette-comparee-iphone-Ss-97315/, 2 pages.
"K11 Bumper vs. RhinoShield Crash Guard: Super Thin Protective Bumpers for iPhone 6s Plus!", posted Feb. 23, 2016, [retrieved Jan. 26, 2018]. Retrieved from Internet,<URL:https://www.youtube.com/watch?v=eX5ETZkOhj4>, 3 pages.</url:<a>.
"Nokia Lumia 820—Our most versatile Lumia", Nokia, accessed at http://www.nokia.com/global/products/phone/lumia820/, accessed on Aug. 29, 2013, 6 pages.
"Sharp Executive Confirms iPhone 8 to Use OLEO Display; Limited to Only Premium 5.5-inch Plus Model", Oct. 29, 2016, accessed at (http://www.redsnOw.US/2016/10/sharp-executiveconfirms-iphone-8-to.html).
"Spare wallets rejoice, the plastic budget iPhone 5S cometh, The iPhone 5S may not be an incremental increase but a decrease, in price and build quality.", stuff.iv, accessed at http://www.stuff.tv/apple/sparse-wallets-rejoice-plastic-budget-iphone-5s-cometh/news, accessed on Mar. 23, 2013, 1 page.
@NOWHEREELSEFR, "Just Another Purported #iPhone6 or #iPhoneAir Dummy . . . #Apple", published May 4, 2014, accessed at https://twitter.com/NowhereElseFr/status/462938116924264448/photo/1, 5 pages.

@ONLEAKS, "#iPhone X!!! Yes, time has already come to meet the new #iPhone ....", Published Jan. 6, 2019, accessed at https://twitter.com/Onleaks/status/1081902300434780161, 5 pages.
Brownlee, Marques "Apple iPhone X Unboxing!", Youtube.com, Oct. 31, 2017, Available at <https://youtu.be/IODoQYGZt8M?t=68>.
Carlson, Ronald Tapscape.com, "Translucent iPhone: Will Apple Revisit G3 iMac?," accessed at http://www.tapscape.com/translucent-iphone/, accessed on Apr. 3, 2013, 3 pages.
Cultofandroid, "This Android-Powered iPhone SC Clone Will Cost Just $100 In China", accessed at http://www.cultofandroid.com/40408/this-android-powered-iphone-Sc-clone-will-cost-just-100-in-china/?utm_campaign=twitter&utm_medium=twitter&utm_source=twitter, accessed on Aug. 27, 2013,2 pages.
Daily Life News, "iPhone 5s Leaked Images Hint 2 Different Screen Sizes", accessed at https://www.youtube.com/watch?v=8tcTHa63WHI, accessed on Apr. 10, 2013, 4 pages.
Engadget, "Meizu's M8? Apple lawyers, start your engines", accessed at http://www.engadget.com/2007/01/29/meizus-m8-apple-lawyers-start-your-engines/, accessed on Jan. 29, 2007, 3 pages.
Everythingapplepro, "The 2018 iPhone X Plus Will be BIG!", Youtube.com, Feb. 12, 2018, Available at <https://youtu.be/m2iMjpAkTeQ?t=14>.
Faulkner, Cameron "Essential Phone Review", Tech Radar, [retrieved on Nov. 25, 2017], 2017, accessed at Retrieved from the Internet: (URL: http://www.tech Yadar, com/reviews/essential-phone).
Gokey, M. "LG G3 vs. HTC One M8: Which Android Flag Should iPhone Haters Fly?", published Sep. 18, 2014, accessed at www.digitaltrends.com/mobile/lg-g3-vs-htc-onem8/,12 pages.
Gorsler, Fabian "Leak Suggests Apple Will Release 3 New iPhone Models in 2018", Highsnobiety.com, Nov. 14, 2017, Available at <https://www.highsnobiety.com/2017/11 /14/three-new-iphones-2018/>.
Gsmarena, "Nokia Lumia 820", accessed at http://www.gsmarena.com/nokia_lumia_820-4968.phpaccessed on Aug. 29, 2013, 2 pages.
Gsmarena, "Xiaomi MI-2", accessed at http://www.gsmarena.com/xiaomi_mi_2-4928.php, accessed on Aug. 29, 2013, 2 pages.
Gsmarena, "Xiaomi MI-2s", accessed at http://www.gsmarena.com/xiaomi_mi_2s-5397.php, accessed on Aug. 29, 2013, 2 pages.
Karmakar, Amit "The iphone X plus 2018 Dummy model and leaks", Youtube.com, Dec. 1, 2017, Available at <https ://www.youtube.com/watch?v=1pEesxplOd4>.
MacManus, Christopher "Artist pictures a budget iPhone—in color.", cnet.com, accessed at http://www.cnet.com/au/news/artist-pictures-a-budget-iphone-in-color/, accessed at Mar. 21, 2013, 4 pages.
Maggio, Edoardo "These renders show what Apple might have planned for the successor to the iPhone X", BusinessInsider.com, Jan. 24, 2018, Available at <https://www.businessinsider.com.au/martin-hajek-renders-apple-2018-iphone-x-successor-2018-1 ?r=US&IR=T>.
Mashable, "Sharp Aquos S2 is a Nearly Bezel-Less Phone with Mid-Range Specs", Aug. 8, 2017, Retrieved from the Internet: (URL http://mashable.com/2017 /08/08/sharp-aquoss2/#COSq3NOtzOqV), 10 Pages.
Mayo, B. "Purported iPhone 6 Pictures Show Protruding Camera, Rounded Edges", 9to5Mac.com, accessed at http://9to5mac.com/2014/03/31 /purported-iphone-6-pictures-showprotruding-camera-rounded-edges/, 23 pages.
Mia, P. "Apple Leak Reveals All Glass Phone With 3D Sensor; Touch Bar Feature Redefines Emoji Use; Is This iPhone 8?", GameNGuide, Oct. 31, 2016, accessed at (http://www.gamenguide.com/articles/60727 /20161 031 /apple-leak-reveals-all-glass-phone-with-3d-sensor-touch-bar-featu re-redefines-emoji-use-is-this-iphone-8.htm).
Photo-John, "Apple's iPhone 5 Camera—What's New?", as archived at https://web.archive.org/web/20140805181048/http://www.photographyreview.com/reviews/apple-iphone-5-camera-whats-new, published Sep. 12, 2012, 3 pages.
Stuff Staff in News, "Apple's new iPhone to come in a five colours.", stuffmideast.com, accessed at http://stuffmideast.com/2013/04/11 /151344/apples-new-iphone-to-come-in-a-five-colours/ , accessed on Apr. 11, 2013, 1 page.

(56) References Cited

OTHER PUBLICATIONS

Swift, "BBK Vivo Xplay X510W Review", published Oct. 21, 2013, accessed at http://chinesetech.net/2013/10/21/bbk-vivo-xplay-x51Ow-review/, 12 pages.
Team Digit, "Exclusive: First look at 2019 Apple iPhone XI renders", digit.in, Jan. 7, 2019, accessed at https://www.digit.in/news/mobile-phones/exclusive-first-look-at-2019-iphonexi-renders-45655.html, 3 pages.
Techdesigns, "iPhone 8 Official 2017—Concept", Youtube, Oct. 27, 2016, accessed at (https://www.youtube.com/watch?v=LYUJYLD1XR0).
Welectronics.Com, "Xiaomi MI 2 GSM unlocked", accessed at http://www.welectronics.com/gsm/misc/XIAOMI-MI-2.HTML?gclid=CK7Nr9bvrYCFYOo4AodZ0EAEW, accessed at Aug. 29, 2013, 2 pages.
Wu, Debbie "All three iPhone 8 models to have glass backs", Nikkei Asian Review, Oct. 26, 2016, accessed at (https://asia.nikkei.com/Business/Companies/All-three-iPhone-8-models-to-have-glass-backs?page=1).

* cited by examiner

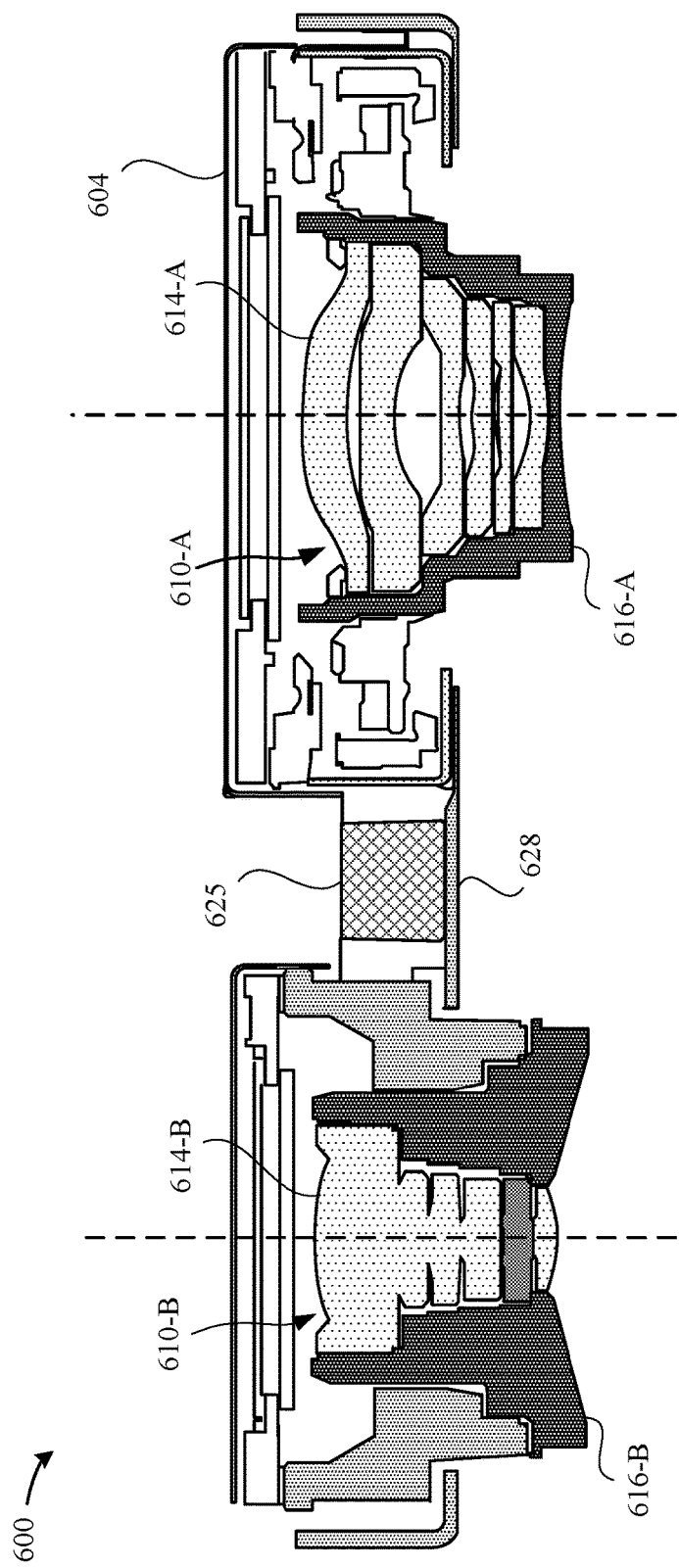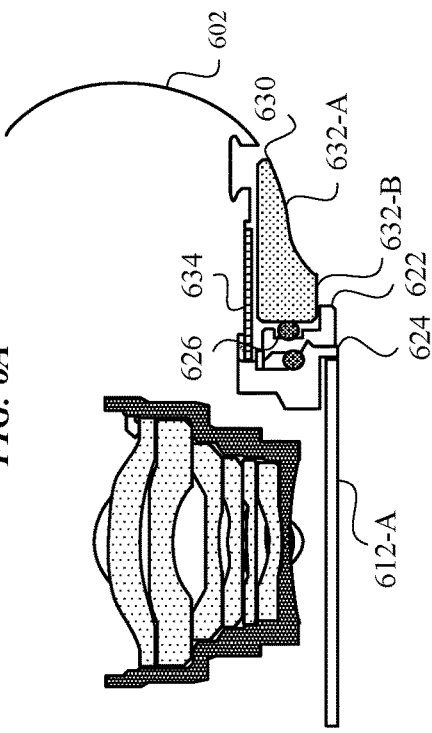
FIG. 6A
FIG. 6B

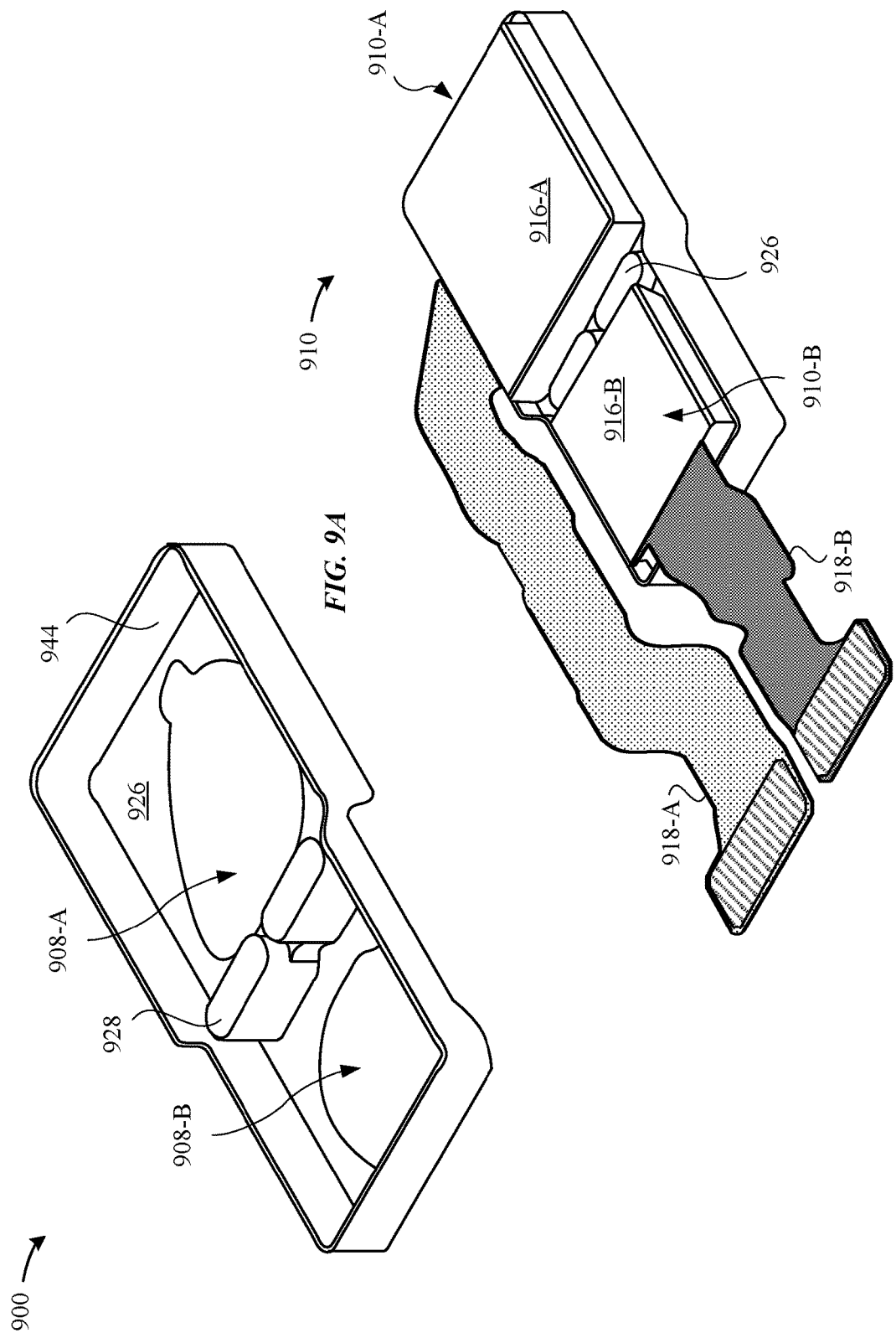

PORTABLE ELECTRONIC DEVICE

CROSS-REFERENCE TO RELATED APPLICATIONS

The present application claims the benefit of U.S. Provisional Patent Application No. 62/897,901, entitled "PORTABLE ELECTRONIC DEVICE," filed Sep. 9, 2019. The present application is a continuation-in-part of U.S. Design patent application No. 29/683,766, entitled "ELECTRONIC DEVICE," filed Mar. 15, 2019, U.S. Design patent application No. 29/676,128, entitled "ELECTRONIC DEVICE," filed Jan. 8, 2019, and U.S. Design patent application No. 29/676,127, entitled "ELECTRONIC DEVICE," filed Jan. 8, 2019, the contents of which are incorporated by reference herein in their entirety for all purposes.

This patent application is also related and incorporates by reference in its entirety the following co-pending patent application:

U.S. patent application Ser. No. 16/586,276 entitled "PORTABLE ELECTRONIC DEVICE" by SPRAGGS et al. filed Sep. 27, 2019.

FIELD

The described embodiments relate generally to structural components for securing a camera module in an enclosure for a portable electronic device. More particularly, the described embodiments relate to support structures for securing multiple camera modules.

BACKGROUND

Recent technological advances have enabled manufacturers to include more operational components (e.g., camera, antenna, sensor, etc.) within a cavity of a portable electronic device. However, due to the manner in which these operational components are precision fit during the assembly process, these operational components are susceptible to becoming misaligned when the portable electronic device is subjected to a drop event. Consequently, the misalignment can cause premature failure of these operational components. Accordingly, there is a need to include support structures to retain these operational components according to a predetermined position and alignment.

SUMMARY

This paper describes various embodiments generally to structural components for securing a camera module in an enclosure for a portable electronic device. More particularly, the described embodiments relate to support structures for securing multiple camera modules.

According to some embodiments, a portable electronic device is described. The portable electronic device includes a housing member defining an external sidewall, a first glass cover and a second glass cover, where the second glass cover includes a first region having a first exterior surface, a second region having a second exterior surface vertically displaced from the first exterior surface, where the second region includes a first opening, a second opening, and a third opening, and a transition region having an exterior surface that extends between the first exterior surface to the second exterior surface. The portable electronic device further includes a first camera module disposed within the first opening, a second camera module disposed within the second opening, a strobe module disposed within the third opening, and a trim structure having an edge that overlays the second region of the second glass cover.

According to some embodiments, a portable electronic device is described. The portable electronic device includes a housing including metal side walls coupled to a glass back wall, where the glass back wall includes a first section that transitions to a second section having a planar surface, where a transitional section having a curved surface separates the first and second sections, and openings disposed within the second section. The portable electronic device further includes a first trim structure having an edge that overlays a portion of the planar surface of the second section, a second trim structure having a protrusion that extends proud of an external surface of the edge of the first trim structure, and first, second, and third camera modules that are each disposed within a respective opening of the openings of the second section.

According to some embodiments, a portable electronic device is described. The portable electronic device includes a metal housing having a top wall, a bottom wall, and side walls, where the top wall, the bottom wall, and the side walls are electrically isolated by dielectric elements. The portable electronic device further includes first and second glass covers coupled to the side walls, the second glass cover including an external surface that transitions to a raised section having a planar surface, where the planar surface includes first, second, and third openings. The portable electronic device further includes first and second camera modules that are each disposed within a corresponding opening of the first and second openings, wherein centers of the first and second camera modules are aligned to each other along an axis and a strobe module disposed within the third opening, wherein the third opening is equidistant from the first and second openings.

Other aspects and advantages of the invention will become apparent from the following detailed description taken in conjunction with the accompanying drawings which illustrate, by way of example, the principles of the described embodiments.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 6A-6B illustrates various cross-sectional views of a portable electronic device, according to some embodiments.

FIGS. 9A-9B illustrate various perspective views of operational components of a portable electronic device, according to some embodiments.

Figure 1A:
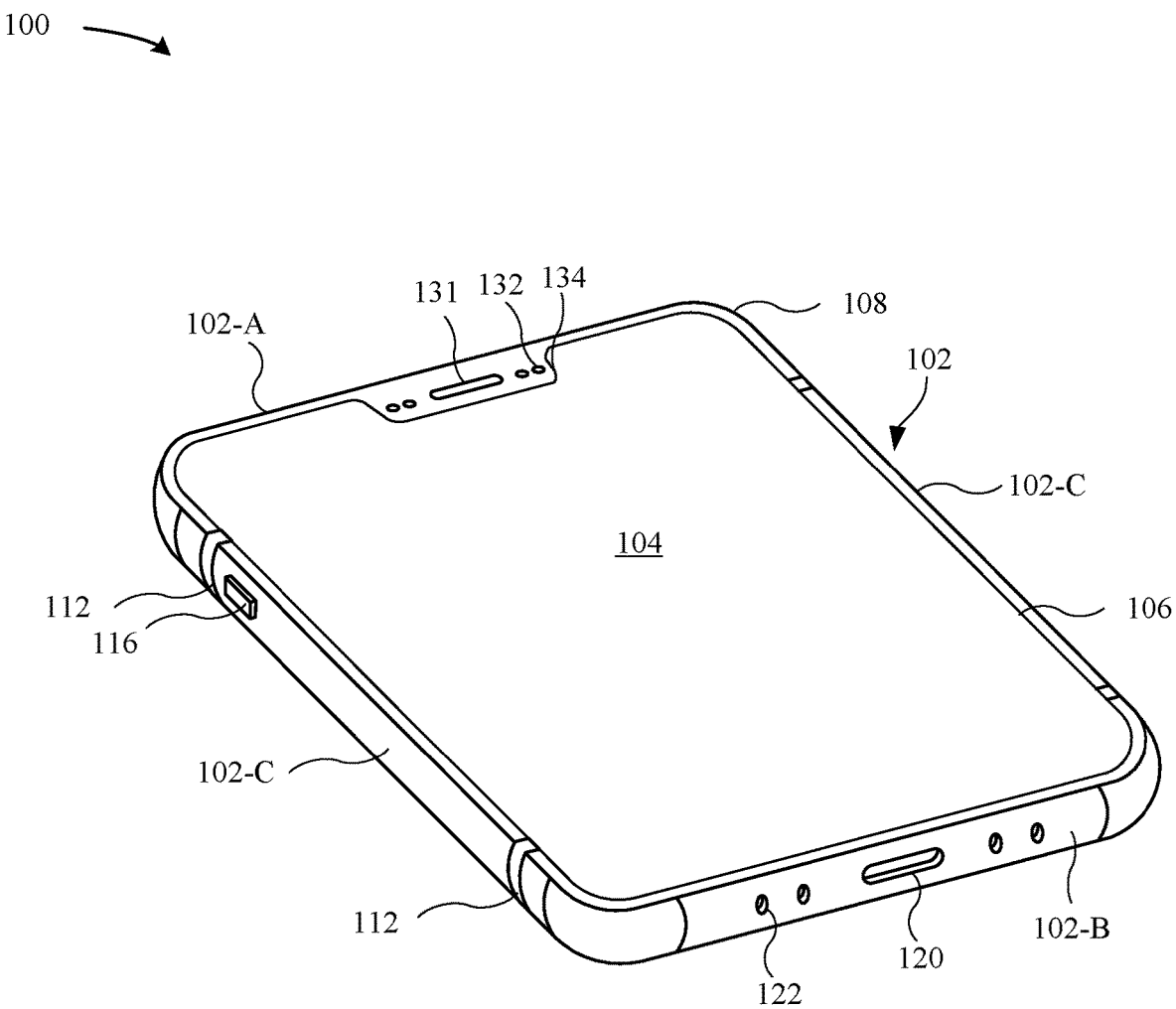
FIGS. 1A-1B illustrate front and rear isometric views of a portable electronic device, according to some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

Recent technological advances and increased consumer demand have driven manufacturers to incorporate additional operational components (e.g., front cameras, rear cameras, antennas, etc.) within a small cavity of an enclosure. However, due to the precise nature of the assembly process, these operational components are susceptible to falling out of alignment when the portable electronic device is exposed to a drop event. Unfortunately, the misalignment of these operational component(s) often leads to their premature failure. The embodiments described herein relate generally to support structures for securing operational components in a portable electronic device. In particular, these support structures maintain the operational components in a known alignment and location even after the portable electronic device is exposed to a drop event.

To cure the aforementioned deficiencies, the systems and techniques described herein relate to support structures such as back walls, trim structures, brace structures, weld washers, and the like that are capable of minimizing damage and/or misalignment of these operational components.

According to some embodiments, a portable electronic device is described. The portable electronic device includes a housing member defining an external sidewall, a first glass cover and a second glass cover, where the second glass cover includes a first region having a first exterior surface, a second region having a second exterior surface vertically displaced from the first exterior surface, where the second region includes a first opening, a second opening, and a third opening, and a transition region having an exterior surface that extends between the first exterior surface to the second exterior surface. The portable electronic device further includes a first camera module disposed within the first opening, a second camera module disposed within the second opening, a strobe module disposed within the third opening, and a trim structure having an edge that overlays the second region of the second glass cover.

These and other embodiments are discussed below with reference to FIGS. 1-12. However, those skilled in the art will readily appreciate that the detailed description given herein with respect to these figures is for explanatory purposes only and should not be construed as limiting.

Figure 1B:
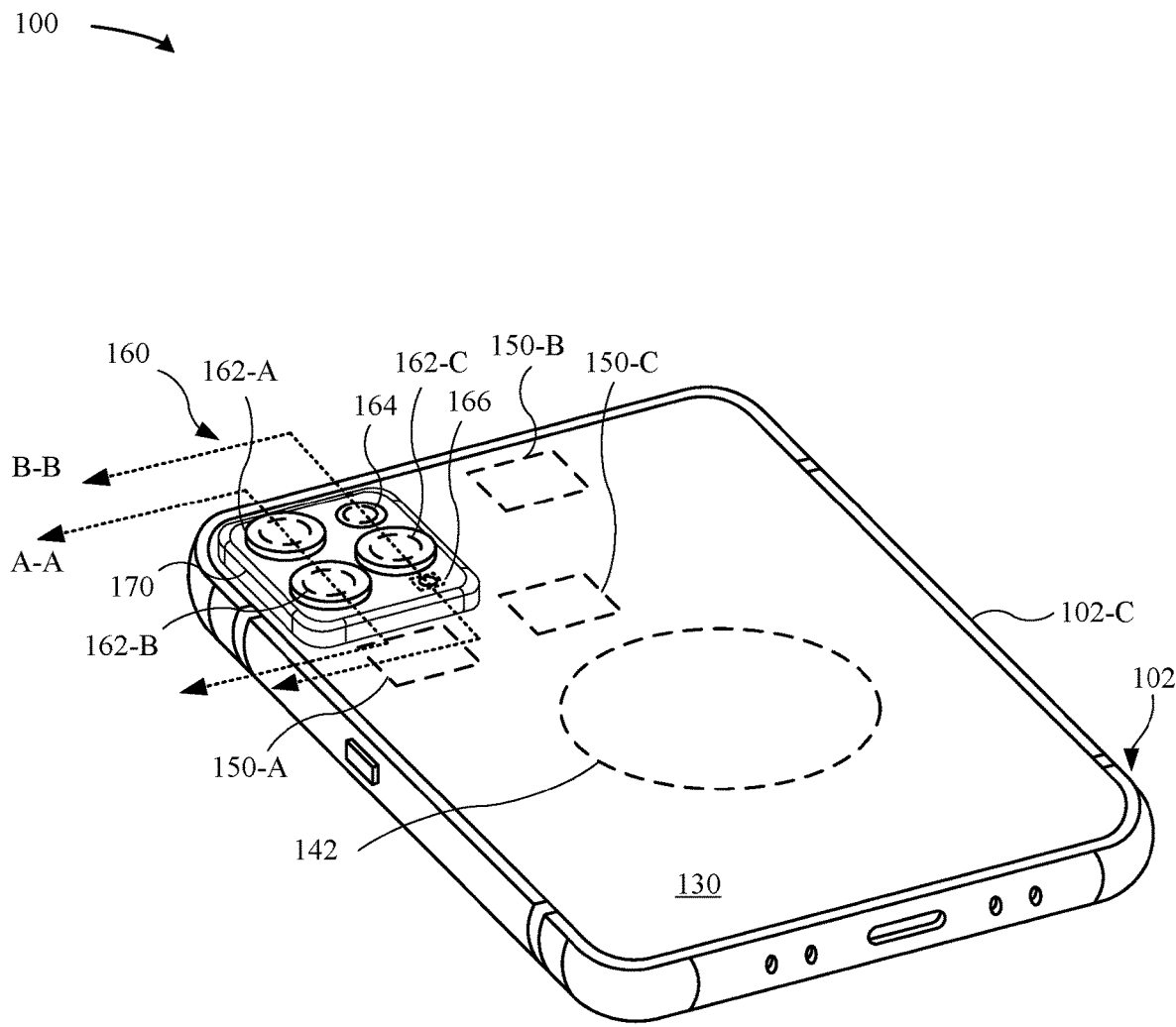

FIGS. 1A-1B illustrate front and rear isometric views of a portable electronic device, according to some embodiments. The portable electronic device described herein includes various support structures that are capable of supporting operational components within a cavity of an enclosure of the portable electronic device. According to some examples, the portable electronic device is a computing device, a smartphone, a laptop, a smartwatch, a fitness tracker, a mobile phone, a wearable consumer device, and the like. The enclosure of the portable electronic device can also be referred to as a housing. It should be noted that the supporting structures described herein may be utilized to secure operational components so as to prevent these operational components from becoming dislodged or misaligned when the portable electronic device 100 experiences a load event (e.g., a drop event).

FIG. 1A illustrates a front isometric view of a portable electronic device 100, where the portable electronic device 100 includes an enclosure 102 having walls that define a cavity, where operational components are carried within the cavity. The enclosure 102 may also be referred to as a housing member. The enclosure 102 includes a top wall 102-A, a bottom wall 102-B, and side walls 102-C. The top, bottom, and side walls 102-A, B, C may define a metal band that surrounds a periphery of the enclosure 102 and define a cavity. The top, bottom, and side walls 102-A, B, C may have a curved cross-section. Additionally, the top, bottom, and side walls 102-A, B, C may include front edge that carry a protective cover 106.

The portable electronic device 100 includes a display assembly 104 that covers substantially all of a top surface of the portable electronic device 100. The display assembly 104 may include a capacitive unit and/or a force detection unit that is capable of detecting an input at the display assembly 104 and presenting a corresponding graphical output at the display assembly 104. In some embodiments, the display assembly 104 is overlaid by the protective cover 106, where the protective cover 106 is secured with a trim structure 108. In particular, the trim structure 108 may be joined to the enclosure 102 with an attachment feature, such as an adhesive, a weld, and the like. The protective cover 106 may prevent surface abrasions and scratches from damaging the display assembly 104. The protective cover 106 may be formed from a transparent material, such as glass, plastic, sapphire, or the like.

In some embodiments, the top wall 102-A may be separated from the bottom wall 102-B by splits having a dielectric material 112, and the side walls 102-C may be separated from the top and bottom walls 102-A, B by splits having a dielectric material 112. The dielectric material 112 can include plastic, injection-molded plastic, polyethylene terephthalate ("PET"), polyether ether ketone ("PEEK"), ceramic, and the like. By incorporating the dielectric material 112, the walls 102-A, B, C are electrically isolated from each other.

According to some embodiments, the portable electronic device 100 includes a switch 116 carried along one of the side walls 102-C. The bottom wall 102-B includes a data connector 120 capable of providing data and/or power to the portable electronic device 100. In some examples, the connector 120 refers to a bus and power connector. The connector 120 is electrically coupled to an internal power supply (not illustrated) carried within the cavity. The bottom wall 102-B includes speaker openings 122 to transmit acoustic output generated by a speaker module carried within the portable electronic device 100.

According to some embodiments, the portable electronic device 100 includes a first electronic component 131 and a second electronic component 132. These electronic components 131, 132 may be utilized for facial recognition. In some examples, the electronic components 131, 132 include a camera, an infrared (IR) light detector, an IR light emitter, and the like. The IR light detector and IR light emitter are capable of authenticating a user for the portable electronic device 100. The first and second electronic components 131, 132 may be carried in a notch 134 in the protective cover 106. The notch 134 has a circular shape or a polygonal shape (e.g., trapezoid, rectangle, square, etc.). The notch 134 may be shorter, taller, wider, rounder and generally any shape as is sufficient to allow for the first and second electronic components 131, 132 to provide functions. The shape and dimensions of the notch 134 is a design choice.

According to some examples, the enclosure 102 includes a combination of metal and non-metal materials. At least one of the top wall 102-A, the bottom wall 102-B or the side walls 102-C may be formed from a metal material (e.g., anodized aluminum, titanium, stainless steel, etc.). In some examples, the top, bottom, and side walls 102-A, B, C may also refer to a metal band that surrounds a periphery of the portable electronic device 100. The top, bottom, and side walls 102-A, B, C may have a chamfered edge. Together, the top, bottom, and side walls 102-A, B, C define a side surface having a spline profile. According to some examples, at least one of the top wall 102-A, the bottom wall 102-B or the side walls 102-C are formed from a non-metal material. According to some examples, the non-metal material includes glass, plastic, ceramic, and the like. Beneficially, the use of non-metal material can reduce the amount of electromagnetic interference associated with the enclosure 102 and a wireless transceiver that is carried within the enclosure 102. Additionally, the use of non-metal material reduces the amount of parasitic capacitance between any metal support structures that are carried within the cavity and the enclosure 102.

According to some embodiments, the portable electronic device 100 carries one or more operational components within a cavity of the portable electronic device 100. These operational components may include a circuit board, an antenna, a multi-core processor, a haptic feedback module, a camera, a strobe module, a sensor, an IR detector, an inductive charging coil, and the like.

FIG. 1B illustrates a rear isometric view of the portable electronic device 100, in accordance with some embodiments. The enclosure 102 may be secured to a back wall 130 that is secured to the enclosure 102. In some examples, the back wall 130 is formed of a non-metal material (e.g., glass, plastic) such as to facilitate electromagnetic field to pass through the back wall 130 to reach and charge wireless charging coil 142 carried within the cavity. In some examples, the trim structure 108 is secured to the back wall 130. Additionally, the back wall 130 may overlay a wireless antenna 150-A, a wireless antenna 150-B, and a wireless antenna 150-C. In some examples, because the back wall 130 is formed of non-metal material, radio-frequency (RF) signals generated by and/or received by the wireless antenna 150-A, B, C may pass through the back wall 130 with little to no interference. The back wall 130 may be constructed of RF transparent material. Although not illustrated in FIG. 1B, the portable electronic device 100 includes a support plate having holes that are aligned with the positions of the wireless antennas 150-A, B, C. In some examples, the back wall 130 may be referred to as a second protective cover and the protective cover 106 referred to as a first protective cover. In some examples, the back wall 130 may be referred to as a back protective cover and the protective cover 106 referred to as a front protective cover. The first and second protective covers may be coupled to the side walls 102-C. Moreover, the side walls 102-C and at least one of the first or second protective covers may define a cavity of the portable electronic device 100.

According to some embodiments, the portable electronic device 100 includes a camera assembly 160 that is carried at a corner portion of the portable electronic device 100. The camera assembly 160 may be carried within a plateau 170 of the back wall 130. In particular, the back wall 130 and the plateau 170 may be integrally formed from a single sheet of non-metal material (e.g., glass). In other words, the plateau 170 and the back wall 130 are a single, seamless piece of material. The plateau 170 is raised relative to a remaining portion of the back wall 130. As illustrated in FIG. 1B, the remaining portion of the back wall 130 has a first thickness and the plateau 170 has a second thickness greater than the first thickness. In some examples, the remaining portion of the back wall 130 corresponds to a first section of the back wall 130 and the plateau 170 corresponds to a second section of the back wall 130. The back wall 130 may be characterized as curvilinear. In some examples, the back wall 130 has a textured surface. In some examples, the back wall 130 includes a combination of different textures. For instance, the plateau 170 may have a smooth surface while the remaining portion of the back wall 130 has a textured surface. As described herein, the textured surface may correspond to peaks separated by valleys. Additionally, the peaks may correspond to a positive vertical deviation relative to a nominal surface and the valleys may correspond to a negative vertical deviation relative to the nominal surface.

The camera assembly 160 includes three camera modules—e.g., a camera module 162-A, a camera module 162-B, and a camera module 162-B. In some examples, these camera modules 162-A, B, C represent a telephoto lens, a wide angle lens, and a super wide angle lens, respectively. However, it should be noted that the positions of the telephoto lens, the wide angle lens, and the super wide angle lens are interchangeable throughout the openings described herein. Additionally, the camera assembly 160 includes a strobe module 164 (or camera flash). The strobe module 164 may include light-emitting diode(s). The plateau 170 may include cut-outs or openings in the material for each of the camera modules 162-A, B, C and the strobe module 164. Portions of the camera modules 162-A, B, C and the strobe module 164 may be disposed through openings in the thickness of the plateau 170. Additionally, in some examples, the plateau 170 carries a microphone 166. The plateau 170 similarly may include an opening for the microphone 166. In some examples, each of the camera modules 162-A, B, C may include a camera turret having an exterior surface that is proud of an external surface of the plateau 170. Beneficially, the use of the plateau 170 facilitates a visual aspect where the camera modules 162-A, B, C appear as a single element. It should be noted that any number of camera modules may be incorporated into a camera assembly carried by the plateau 170.

The camera modules 162-A, B, C of the camera assembly 160 may be arranged in a triangular manner as illustrated in FIG. 1B. In some examples, the camera modules 162-A, B, C of the camera assembly 160 may also be arranged in a satellite manner such as a circular orbit. The camera modules 162-A, B, C are not equally spaced apart from the strobe module 164; however, the camera modules 162-A, B, C may be equidistant from each other. Those of ordinary skill in the art will understand that when a strobe module emits a flash, the flash may cause a red eye effect caused by red pupils in the color photographs of a subject due to the flash being too close in proximity to the camera modules.

In some examples, the camera module 162-A is referred to as a telephoto lens, the 162-B is referred to as a wide angle lens, and the camera module 162-C is referred to as a super wide angle lens. As the wide angle lens—e.g., camera module 162-B—is more likely to be utilized while taking photographs of subjects with the portable electronic device 100, the other camera modules—e.g., the camera modules 162-A, C are calibrated relative to the camera module 162-B. The calibration of these camera modules 162-A, B, C is rendered more challenging due to calibrating for multiple directions (X-axis, Y-axis) as a result of the triangular orientation. Moreover, this calibration is more challenging than if the camera modules were arranged in a linear orientation.

Figure 2:
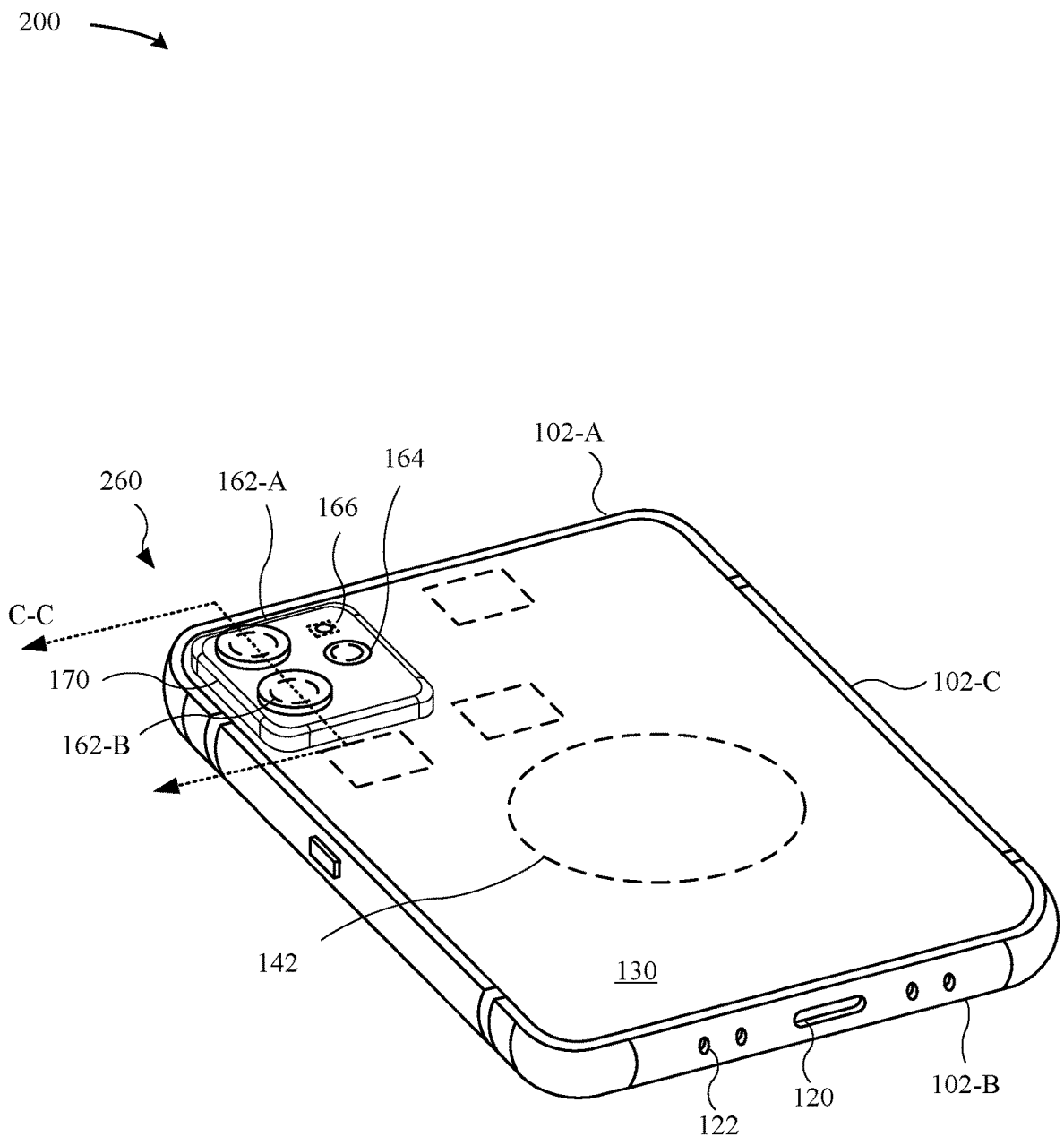
FIG. 2 illustrates a rear isometric view of a portable electronic device, according to some embodiments.

FIG. 2 illustrates a rear isometric view of a portable electronic device 200, in accordance with some embodiments. The portable electronic device 200 is similar to the portable electronic device 100 except that the camera assembly 260 of the portable electronic device 200 includes two camera modules—e.g., the camera module 162-A and the camera module 162-B.

The camera assembly 260 is carried within a plateau 170 of the back wall 130. Notably, the plateau 170 of the camera assembly 160 and the camera assembly 260 are of similar size and shape. However, the camera assembly 260 includes fewer camera modules. Beneficially, rendering the plateau 170 the same size between different embodiments of the camera assembly reduces manufacturing and material costs associated with producing different models of the portable electronic device—e.g., the portable electronic devices 100, 200. As in FIG. 1B, the plateau 170 and the back wall 130 of the portable electronic device 200 may be integrally formed from a single sheet of non-metal material (e.g., glass). In other words, the plateau 170 and the back wall 130 are a single, seamless piece of material. The plateau 170 is raised relative to a remaining portion of the back wall 130. The plateau 170 includes an opening for a strobe module 164 and a microphone module 166. In other embodiments, it may be noted that the plateau 170 is separately formed from the back wall 130 and that they are formed of different materials. For example, the plateau 170 may be formed from metal and the back wall 130 formed from glass or plastic. The metal may be bonded to the glass or plastic.

FIGS. 3A-3H illustrate various perspective views of a portable electronic device, according to some embodiments. It should be noted that one or more features of the enclosure—e.g., materials, shape, switches, etc.—may be shared between the portable electronic devices described with reference to FIGS. 3A-3H.

Figure 3A:
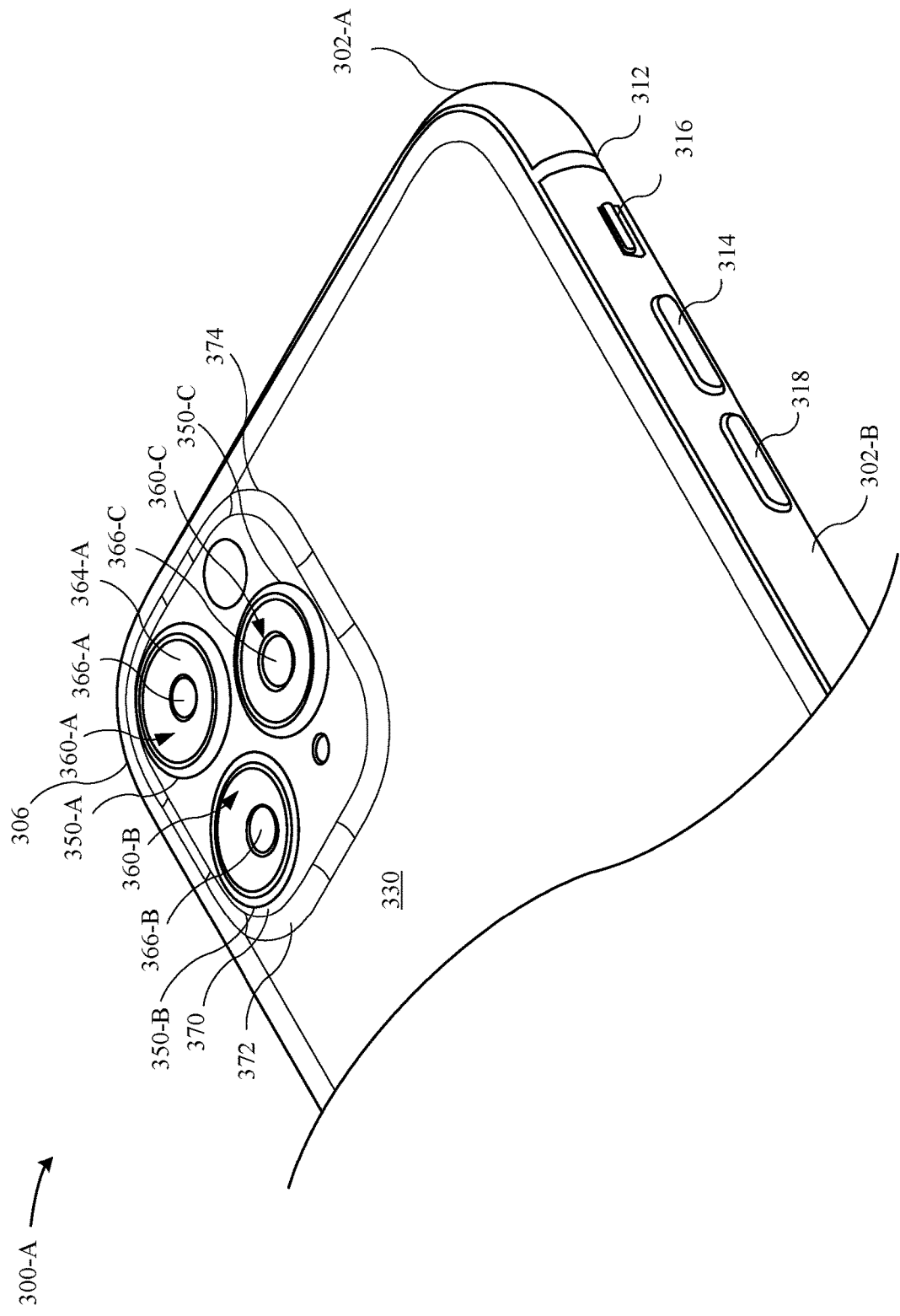
FIGS. 3A-3H illustrate various perspective views of a portable electronic device, according to some embodiments.

FIG. 3A illustrates a perspective view of a portable electronic device 300-A, in accordance with some embodiments. In some embodiments, the portable electronic device 300-A corresponds to the portable electronic device 100, as illustrated in FIGS. 1A-1B. The portable electronic device 300-A includes an enclosure having a top wall 302-A, a bottom wall, and side walls 302-B that form a metal band structure that surrounds a periphery of the portable electronic device 300-A. The metal band structure may be formed from anodized aluminum, titanium, or stainless steel. The metal band structure may include dielectric bands 312 that isolate the top wall 302-A from the side walls 302-B. External surfaces of the dielectric bands 312 may be flush with the external surfaces of the top, bottom, and side walls 302-A, B, C. The dielectric bands 312 may be color matched to a color of the top, bottom, and side walls. The side walls 302-B includes a slide switch 316 that is capable of causing the portable electronic device 300-A to transition between a ringer state and a silent state. The slide switch 316 is capable of sliding between an off and on state. When the slide switch 316 is aligned with the rocker switches 314, 318, then a ringer is on. The rocker switches 314, 318 are capable of respectively increasing and lowering a system volume of the portable electronic device 300-A.

The portable electronic device 300-A includes a back wall 330 having a first thickness. The back wall 330 may be characterized as having a planar surface. The raised portion 370 is integrally formed with the back wall 330 so that the back wall 330 and the raised portion 370 are seamless. In other words, the back wall 330 may be formed by machining away material of the back wall 330. The raised portion 370 may be parallel to portions of the back wall 330 and non-parallel to other portions of the back wall 330. The raised portion 370 has a second thickness greater than the first thickness of the back wall 330. The back wall 330 may be formed of RF-transparent material (e.g., glass, etc.) such as to allow for RF signals to pass through the back wall 330 to reach a wireless antenna carried by the portable electronic device 300-A. In some examples, the back wall 330 is formed of colored glass. The colored glass may have a matte or frosted surface finish that is defined as textures along the surface of the back wall 330. Additionally, the raised portion 370 may be formed of colored glass that is color-matched to the colored glass of the back wall 330. In some examples, the back wall 330 and/or the raised portion 370 is visually transparent such that nearly all visible incident upon the external surface of the back wall 330 passes through. In some examples, the back wall 330 is capable of imparting a frosted or matte surface appearance due to diffuse reflection of visible light incident thereupon. Additionally, the back wall 330 is transparent to electromagnetic field signals and enables an electromagnetic field to pass through the back wall 330 to reach the wireless charging coils—e.g., the wireless charging coils 142.

The portable electronic device 300-A includes a back wall 330 having a corner portion 306. Adjacent and near to the corner portion 306 (e.g., less than a distance of 3 cm) is a raised portion 370 of the back wall 330. Although the raised portion 370 may also be positioned near the top wall 302-A or the bottom wall of the portable electronic device 300-A. Similar to the back wall 330, the raised portion 370 also includes RF-transparent and EMF-transparent material (e.g., glass, etc.). In some examples, the raised portion 370 is approximately 0.2 mm to 2 mm from an external surface of the back wall 330. However, it should be noted that the height of an external surface of the raised portion 370 relative to an external surface of the back wall 330 may be of any height as long as it does not impact the operation and functionality of the camera modules, strobe module, and microphone module carried in part by the raised portion 370. A transition edge 372 separates the back wall 330 from the raised portion 370, and the transition edge 372 bridges the difference between the thickness of the back wall 330 and the thickness of the raised portion 370. In some examples, the transition edge 372 has an average thickness that is less than the thickness of the raised portion 370. In some examples, the transition edge 372 has a curved profile, is a chamfer or is a cavetto (e.g., concave face). The face of the transition edge 372 is not parallel to the external surfaces of the back wall 330 and the raised portion 370. Additionally, a design aesthetic of having a varying height along the transition edge 372 is also envisioned. The transition edge 372 may have a uniform thickness throughout and an infinite loop. The transition edge 372 may have a non-uniform thickness. In some examples, the external surface of the raised portion 370 has a textured surface or a smooth, polished surface. The external surfaces of the back wall 330, the transition edge 372, and the raised portion 370 may be of any combination of the aforementioned surface finishes as long as it does not impact the operation and functionality of the camera modules, strobe module, and microphone module. In some examples, the surface finishes can include a frosted surface appearance. The textured surface or the smooth, polished surface finishes of the external surfaces of the back wall 330, the transition edge 372, and the raised portion 370 may be formed through at least one of a chemical etching or mechanical etching process.

The raised portion 370 has a polygonal shape with rounded corners 374. The rounded corners 374 are raised relative to the external surface of the back wall 330. The rounded corners 374 may curve along a transitional edge 372 disposed between the raised portion 370 and the back wall 330. In other examples, the transitional edge 372 is a straight edge instead of a curved edge. The transitional edge 372 has a curved surface. It should be noted that any surface shape along the transitional edge 372 may be implemented as a design choice as long as it does not impact the operation and functionality of the camera modules, strobe module, and microphone module carried in part by the raised portion 370. Although FIG. 3A illustrates that the raised portion 370 is entirely bordered by a transitional edge 372, it should also be noted that the raised portion 370 may only be partially bordered by the transitional edge 372.

The raised portion 370 includes multiple openings for the camera modules, strobe module, and microphone module. As illustrated in FIG. 3A, the raised portion 370 includes a first camera opening 350-A, a second camera opening 350-B, a third camera opening 350-C, a strobe opening, and a microphone opening. These openings are formed by machining through an entire thickness of the raised portion 370. Disposed within the first camera opening 350-A is a first camera module 360-A, disposed within the second camera opening 350-B is a second camera module 360-B, and disposed within the third camera opening 350-C is a third camera module 360-C. Each of the camera modules 360-A, B, C may include a camera chassis that carries a lens element. The lens element may be centered relative to the camera chassis. For example, FIG. 3A illustrates that a center of the first lens element 366-A is centered relative to the camera chassis of the first camera module 360-A, a center of the second lens element 366-B is centered relative to the camera chassis of the second camera module 360-B, and a center of the third lens element 366-C is centered relative to the camera chassis of the third camera module 360-C. It is understood by those of ordinary skill in the art that the lens elements 366-A, B, C of the camera modules 360-A, B, C are calibrated based on their positional relationship to each other. In other words, the positioning of the centers of the lens elements 366-A, B, C may not be random. In some examples, the centers of the first and second camera modules 360-A, B are along a same axis relative to each other and the axis is parallel to the side walls 302-B.

FIG. 3A illustrates that each of the camera modules 360-A, B, C includes a turret window that overlays the lens elements 366-A, B, C. A first turret window 364-A overlays the lens element 366-A, a second turret window 364-B overlays the lens element 366-B, and a third turret window 364-C overlays the lens element 366-C. In some examples, the external surfaces of the first, second, and third turret windows 364-A, B, C are coplanar to the external surface of the raised portion 370. In other examples, the external surfaces of the first, second, and third turret windows 364-A, B, C are proud of or recessed relative to the external surface of the raised portion 370. In some instances, the first, second, and third turret windows 364-A, B, C may be recessed or coplanar to the external surface of the raised portion 370 such as to prevent scratching of the turret windows when the back surface of the portable electronic device 300-A is slid across a rough surface.

Figure 3B:
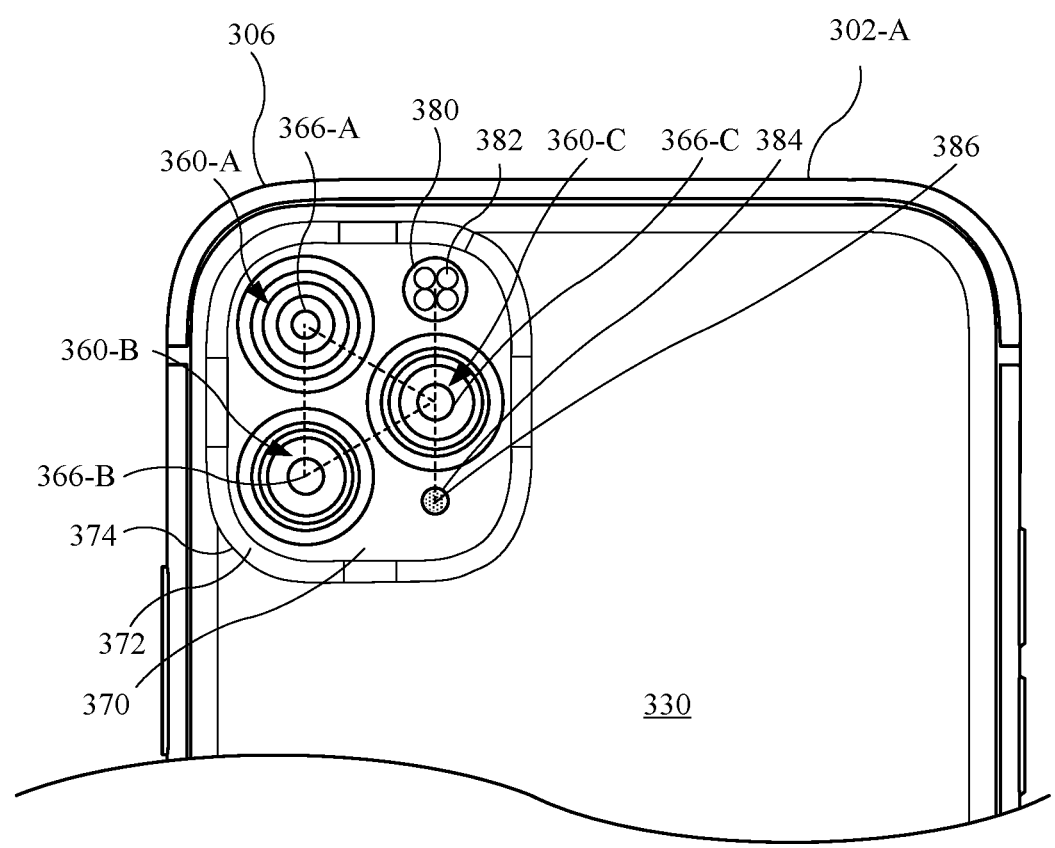

FIG. 3B illustrates a top view of the portable electronic device 300-A, according to some embodiments. FIG. 3B illustrates that the raised portion 370 has a generally polygonal shape with curved/rounded edges. In some examples, the raised portion 370 may have a shape that corresponds to a circle, ellipse, rectangle, trapezoid, polygon or square as long as such a shape does not impact the operation and functionality of the camera modules, strobe module, and microphone module. The shape of the raised portion 370 may be a design choice and the shape shown in FIG. 3B should not be considered limiting of other possibilities.

FIG. 3B illustrates that the center of the first lens element 366-A is equidistantly separated from the center of the second lens element 366-B and the center of the third lens element 366-C. Indeed, FIG. 3B illustrates that the first, second, and third lens elements 366-A, B, C are arranged according to a triangular orientation. In some examples, the first, second, and third lens elements 366-A, B C are arranged in an equilateral triangular orientation. The raised portion includes a strobe opening 380 for the strobe module 382 and a microphone opening 384 for the microphone module 386. The center of the strobe opening 380 and the center of the microphone opening 384 may be disposed in a non-equidistant spacing from the first, second, and third camera modules 360-A, B, C. Although FIG. 3B illustrates that the strobe module 382 is disposed closer to the top wall 302-A and above the microphone module 386, it should be noted that the positioning of these modules may be also be switched. In some examples, the centers of the third camera module 360-C, the strobe module 382, and the microphone module 386 are along a same axis relative to each other and the axis is parallel to the side walls 302-B. In some examples, the centers of the third camera opening 350-C, the strobe opening 380, and the microphone opening 384 are along a same axis relative to each other and the axis is parallel to the side walls 302-B. The third camera opening 350-C may be larger than the strobe opening 380, and the strobe opening 380 may be larger than the microphone opening 384.

FIG. 3B illustrates that the raised portion 370 is disposed proximate to the corner 306 of the portable electronic device 300-A. However, it should be noted that the raised portion 370 may also be disposed along a center of the back wall 370, along a midline of the back wall 370, or asymmetrically disposed relative to the midline of the back wall 370.

Figure 3C:
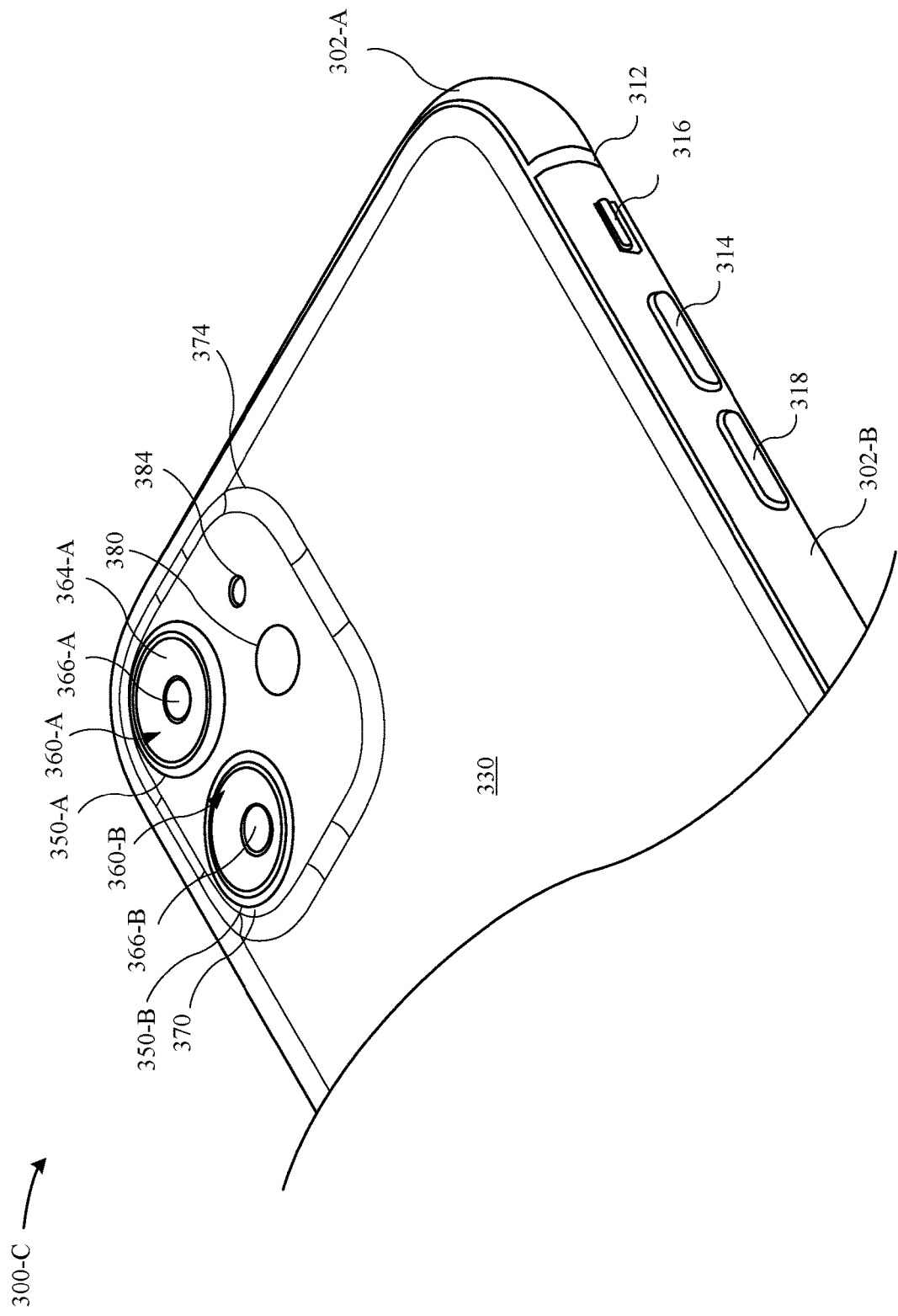

FIG. 3C illustrates a perspective view of a portable electronic device 300-C, according to some embodiments. In some embodiments, the portable electronic device 300-C corresponds to the portable electronic device 200, as illustrated in FIG. 2. The enclosure of the top wall 302-A, bottom wall, and side walls 302-B may be shared by the portable electronic device 300-C. However, the raised portion 370 of the back wall 330 includes two camera modules—e.g., the first camera module 360-A and the second camera module 360-B. The raised portion 370 is elevated relative to an external surface of the back wall 330. The raised portion 370 may be taller, wider, thicker, shorter, longer, or more elongated than as illustrated in FIG. 3C.

Figure 3D:
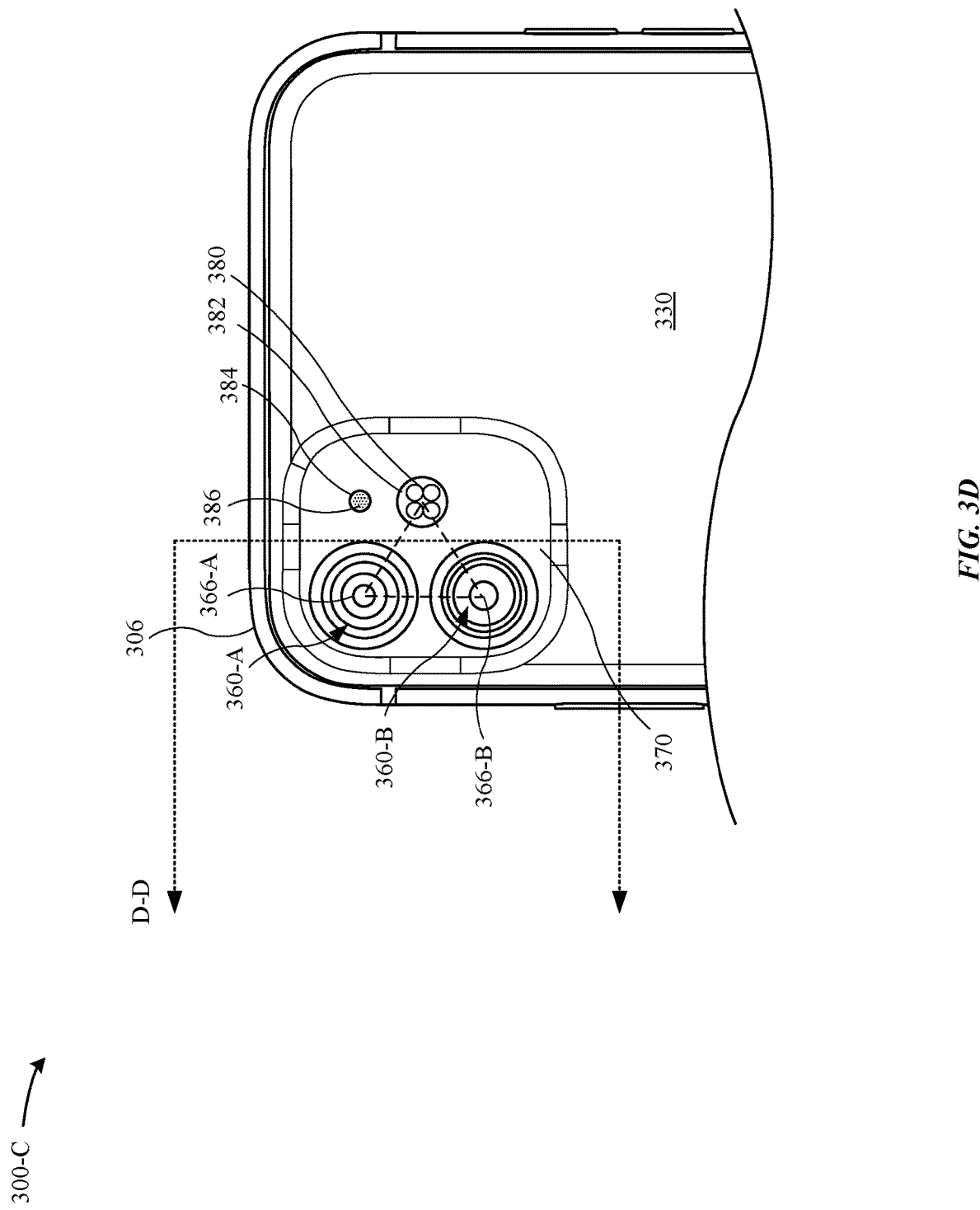

FIG. 3D illustrates a top view of the portable electronic device 300-C, according to some embodiments. As noted above, the raised portion includes two camera modules—e.g., the first camera module 360-A and the second camera module 360-B. The strobe module 382 may be equidistant from the centers of the first and second lens elements 366-A, B. Additionally, the microphone module 386 may be positioned above the strobe module 382 (i.e., the microphone module 386 is positioned closer to the top wall 302-A).

Figure 3E:
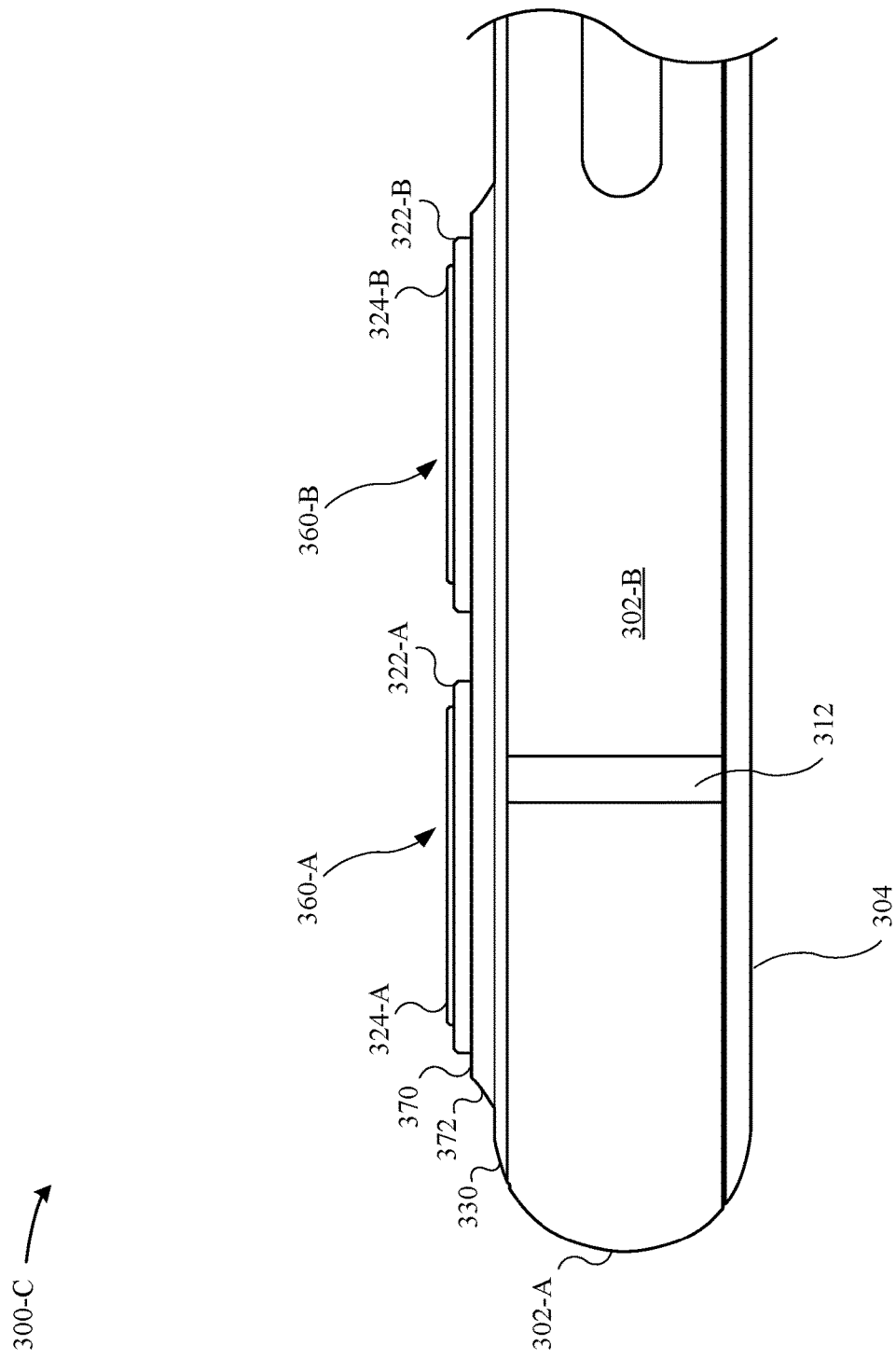

FIG. 3E illustrates a cross-sectional view of the portable electronic device 300-C as taken along the cross-section D-D (see FIG. 3D), according to some embodiments. Although it should be noted that the cross-sectional view may also apply to the portable electronic device 300-A. As illustrated in FIG. 3E, the top wall 302-A is electrically isolated from the side wall 302-B via a dielectric band 312. The external surface of the dielectric band 312 may be flush with the external surfaces of the top and side walls 302-A, B. The top and side walls 302-A, B are secured to a trim structure that carries a protective cover 304 along a front surface of the portable electronic device 300-A. On the opposing rear surface of the portable electronic device 300-A is a back wall 330. The back wall 330 transitions along a transition edge 372 to the raised portion 370. The first and second camera modules 360-A, B are disposed within the raised portion 370. The transition edge 372 may have a curved profile or curved surface. The raised portion 370 has a planar external surface that is overlaid by a first trim structure 322-A, B. The first trim structure 322-A, B has exterior surfaces that overlay portions of the raised portion 370. Additionally, second trim structures 324-A, B have external surfaces that extend proud of the exterior surfaces of the first trim structures 322-A, B. The first trim structures 322-A, B may have a uniform or non-uniform height. The second trim structures 324-A. B may have a uniform or non-uniform height.

Figure 3F:
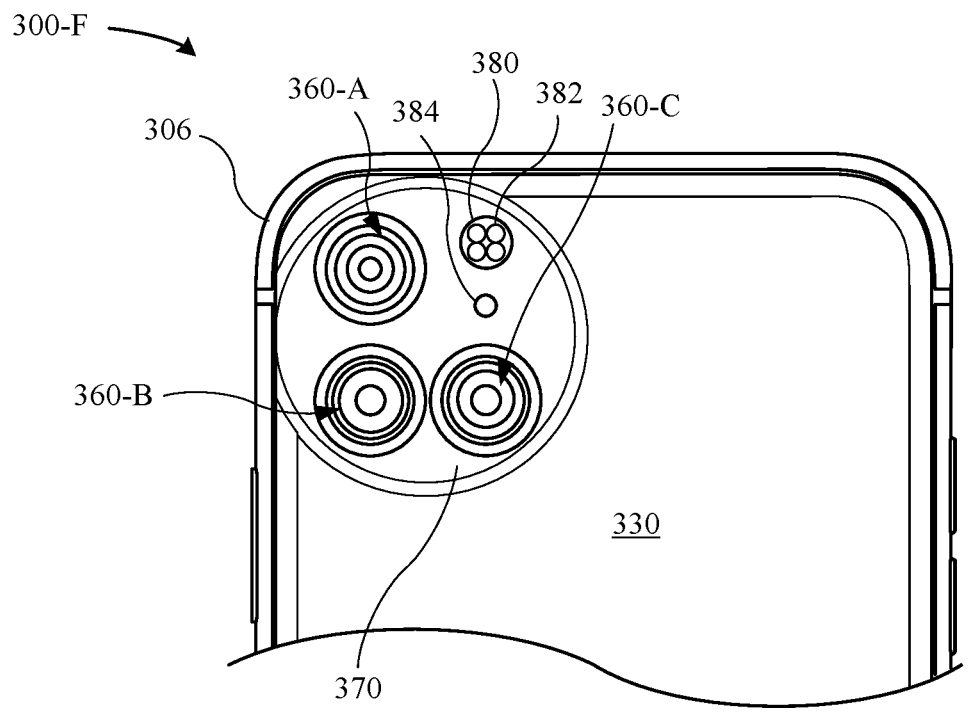
Figure 3G:
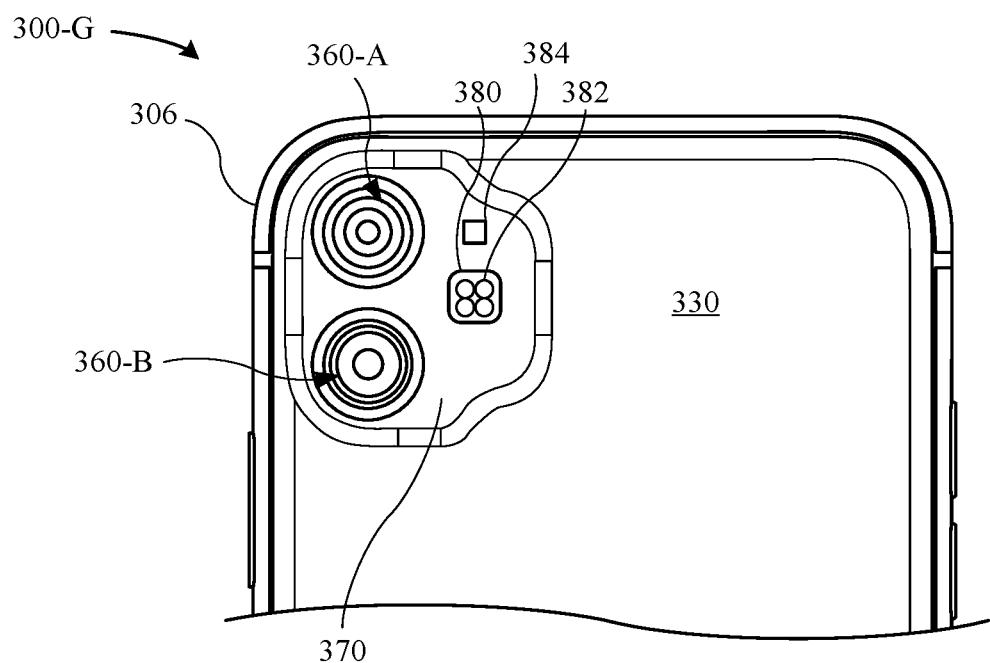
Figure 3H:
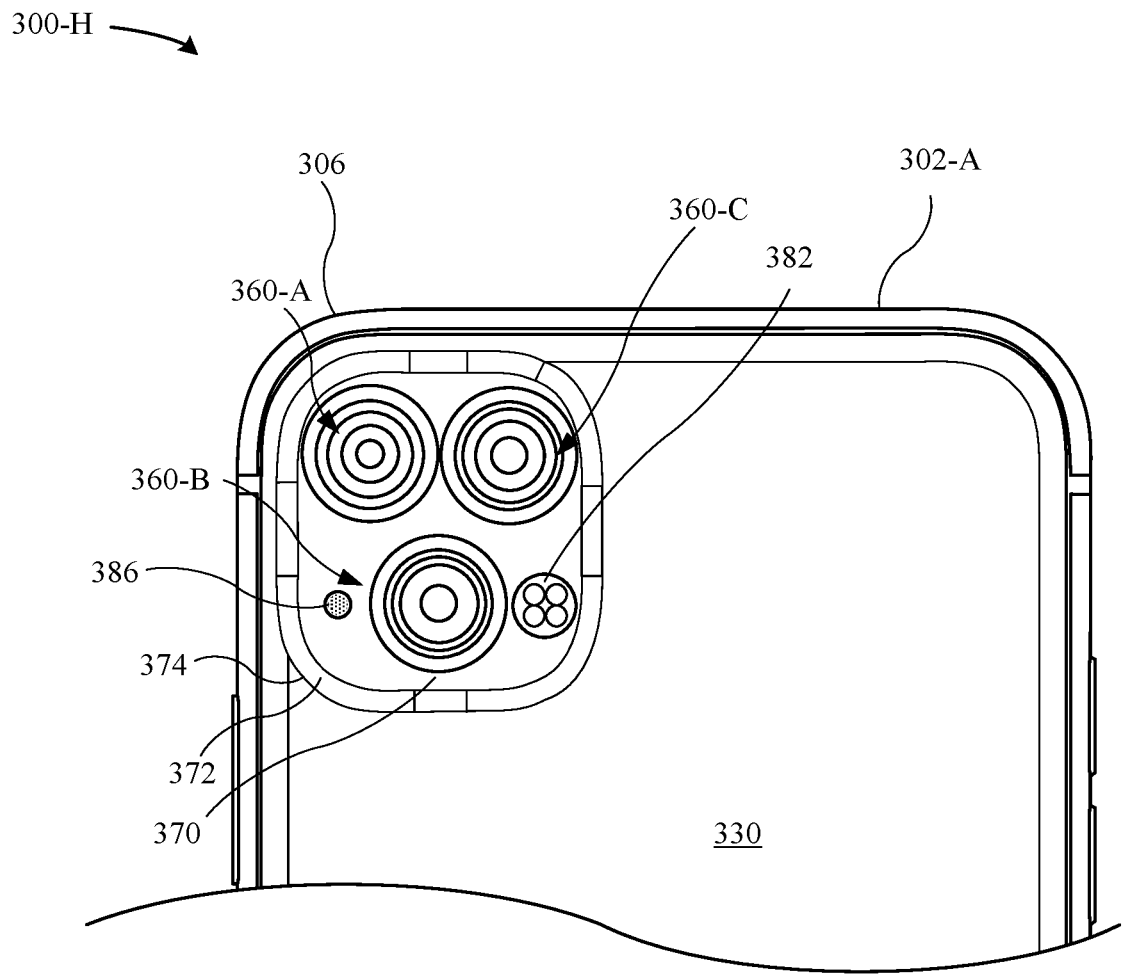

FIGS. 3F-3H illustrate top views of portable electronic devices, according to some embodiments. FIG. 3F illustrates a top view of a portable electronic device 300-F having a back wall 330 that includes a raised portion 370. The raised portion 370 has a circular shape. Additionally, the strobe opening 380 and the microphone opening 384 have circular openings. Additionally, FIG. 3F illustrates that the first, second, and third camera openings 350-A, B, C are oriented in an L-shape that is defined as the second and third camera openings 350-B, C are separated by a first distance that is less than a second distance that separates the first and second camera openings 350-A, B. FIG. 3F illustrates that the first and second camera modules 360-A, B are aligned to each other and the second and third camera modules 360-B, C are aligned to each other. FIG. 3G illustrates a top view of a portable electronic device 300-G having a back wall 330 that includes a raised portion 370. The raised portion 370 has a curvilinear trapezium shape. Additionally, the strobe opening 380 and the microphone opening 384 have polygonal openings and curvilinear shaped openings. FIG. 3H illustrates a top view of a portable electronic device 300-H having first, second, and third camera modules 360-A, B, C that are oriented in a triangular orientation so that the first and third camera modules 360-A, C are aligned along a same axis that is parallel to the top wall 302-A. Additionally, the microphone module 386 and the strobe module 382 are disposed on opposing sides of the second camera modules 360-B.

It should be noted that the dimensions, features, and shapes described with respect to any of the embodiments illustrated in FIGS. 3A-3H are merely representative of many design possibilities that are capable of enabling the camera modules, the strobe module, and the microphone module to function as intended. The openings for the camera modules 360-A, B, C, the strobe module 382, and the microphone module 386 may be any combination of shapes such as a rectangle, a square, a circle, a triangle, and the like. In one example, the first camera opening 350-A is circular and the second camera opening 350-B is a polygonal shape. In another example, the first camera opening 350-A is circular and the second and third camera openings 350-B, C are rectangular. Additionally, the first, second, and third openings for the camera modules 360-A, B, C may be oriented in an L-orientation, a triangular orientation, a circular orientation, or any other orientation. It should also be noted that the positioning of the camera modules 360-A, B, C within the first, second, and third openings 350-A, B, C is interchangeable. For example, the first camera module 360-A may be positioned in the second opening 350-B, the second camera module 360-B may be positioned in the third opening 350-C, and the third camera module 360-C may be positioned in the first opening 350-A. Additionally, the positioning of the first and second camera modules 360-A, B are interchangeable relative to the first and second openings 350-A, B. For example, the position of the telephoto lens can be swapped with the position of the wide angle lens.

Figure 4:
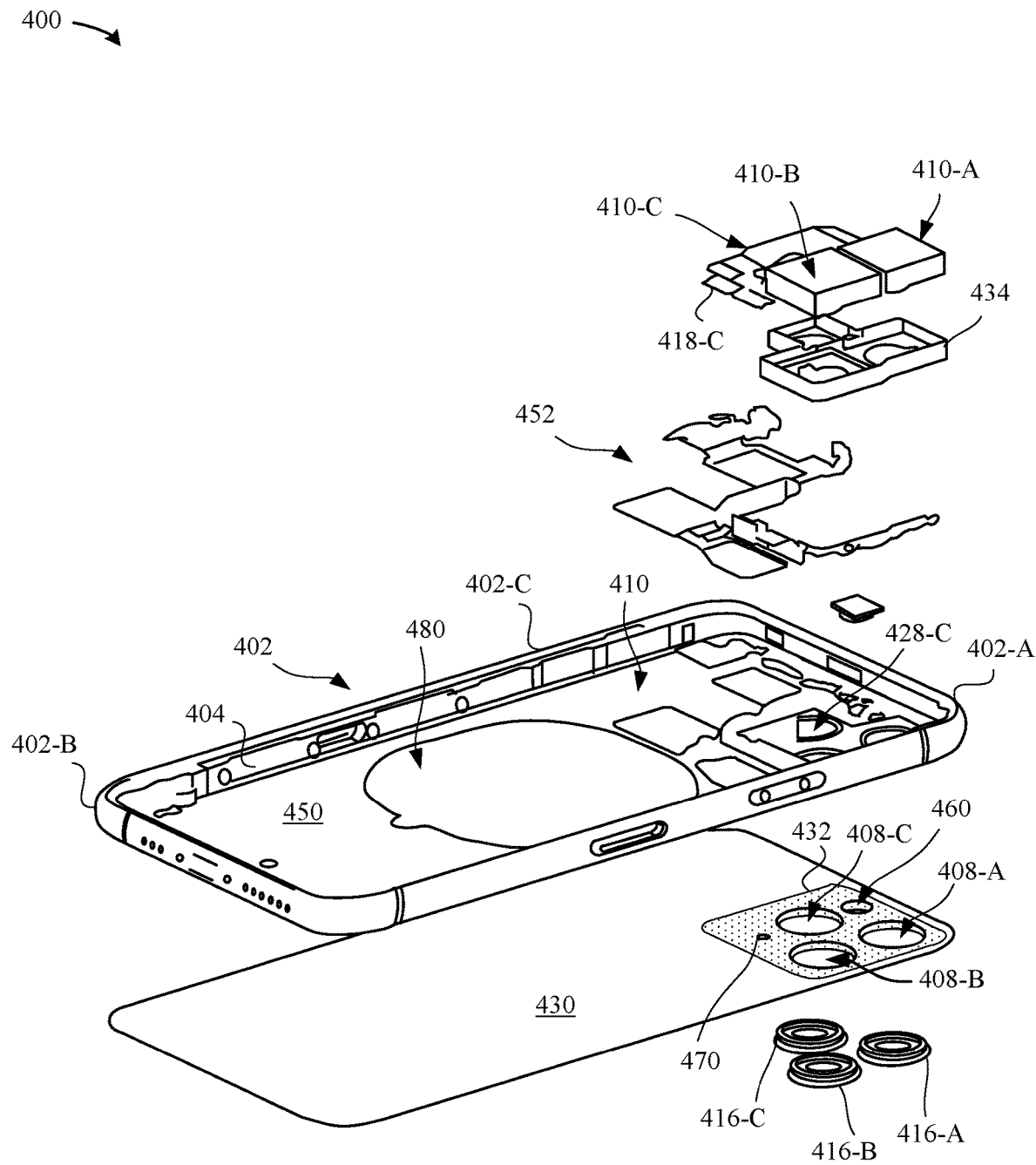
FIG. 4 illustrates an exploded perspective view of a portable electronic device, according to some embodiments.

FIG. 4 illustrates an exploded perspective view of a portable electronic device 400, in accordance with some embodiments. The portable electronic device includes an enclosure 402 having a top wall 402-A, a bottom wall 402-B, and side walls 402-C that are coupled together. The top, bottom, and side walls 402-A, B, C define a cavity 410 capable of carrying operational components therein. Additionally, the side walls 402-C include metal bands 404 disposed along a periphery of the portable electronic device 400. The metal bands 404 are coupled to a back wall 430. The back wall 430 may be a transparent protective layer that is glued or welded to the metal bands 404. The non-metal material enables RF signals and electromagnetic field to pass through the back wall 430. Additionally, the back wall includes a plateau 432 (or raised portion) relative to the remaining portion of the back wall 430. The plateau 432 includes openings 408-A, B, C for camera turrets 416-A, B, C, respectively. The camera turrets 416-A, B, C include glass windows. The plateau 432 also includes openings 460, 470 for a strobe module and a microphone (not illustrated).

The metal bands 404 are coupled to a support plate 450. The support plate 450 is capable of carrying electronic components (e.g., a main logic board, auxiliary logic board, etc.). However, the support plate 450 also includes several openings for one or more wireless antennas 452 and camera modules 410-A, B, C that are disposed through a thickness of the support plate 450. In some examples, the wireless antennas 452 are ultra-wideband antennas. For example, the support plate 450 includes an opening 428-C that is aligned with the opening 408-C and the camera module 410-C. Notably, the camera modules 410-A, B, C are disposed through a thickness of the support plate 450. The support plate 450 also includes a hole 480 for wireless charging coils. In particular, electromagnetic fields may pass through the hole 480 in the support plate 450 to reach the wireless charging coils. The hole 480 may correspond to a region of the support plate 450 that is cut-out/removed entirely.

The camera modules 410-A, B, C are carried by a brace structure 434. The brace structure 434 includes individual brackets and springs for aligning each of the camera modules 410-A, B, C to a predetermined location—e.g., aligned with the openings 408-A, B, C. Once the camera modules 410-A, B, C are secured and aligned within the brackets of the brace structure 434, the brace structure 434 is mounted on top of a base of the support plate 450. The brace structure 434 may be tuned to have varying degrees of stiffness so as provide an optimal load dispersion path when the portable electronic device 100, 200 is exposed to a drop event. Additionally, the support plate 450, the brace structure 434, and the trim structures described herein may be tuned to selectively cause deflection of the load away from operational components and instead towards the enclosure, which is generally formed of a unibody construction and, as a result, has a greater amount of stiffness capable of bearing the stress associated with the load.

Figure 5A:
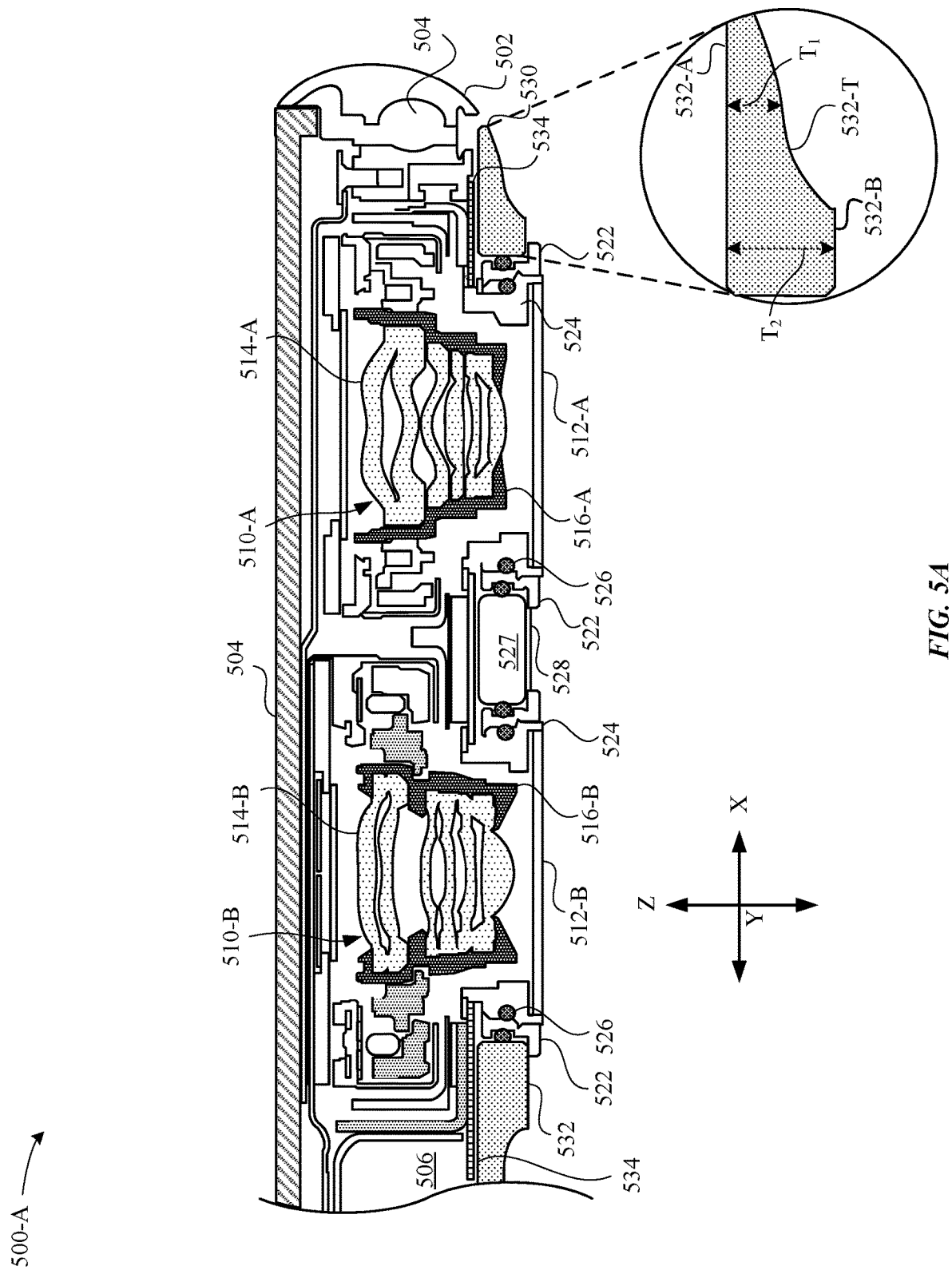
FIGS. 5A-5B illustrate various cross-sectional views of a portable electronic device, according to some embodiments.
Figure 5B:
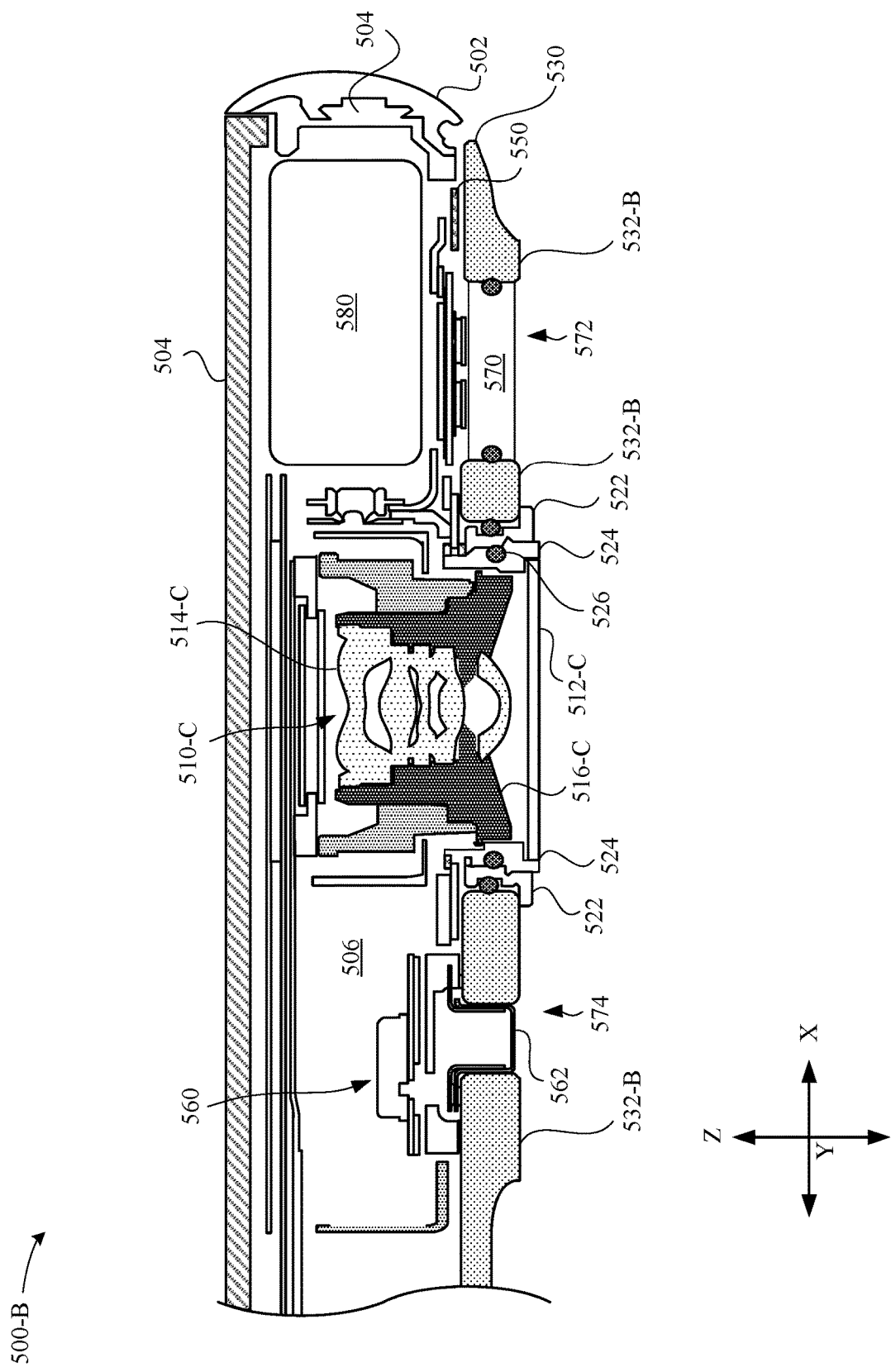

FIGS. 5A-5B illustrate various cross-sectional views of a portable electronic device, according to some embodiments. In particular, FIG. 5A illustrates a cross-sectional view 500-A of a camera assembly taken along the A-A cross-section of the portable electronic device 100 of FIG. 1B. The portable electronic device 100 includes an enclosure defined by side walls 502 and a back wall 530. In particular, the side walls 502 include metal bands 504 that are secured to the back wall 530. In some instances, the metal bands 504 are secured to the back wall 530 via at least one of an adhesive, a fastener or a weld. The side walls 502 carry a trim structure (not illustrated) that supports a protective cover 504. In some examples, the protective cover 504 overlays a display assembly. The back wall 530 may also be referred to as a back protective cover.

The back wall 530 is formed of a transparent material (e.g., glass) and includes a raised portion (or plateau). Notably, the back wall 530 includes a first section 532-A and a second section 532-B that is raised relative to the first section 532-A. The first section 532-A has a first thickness (T1) and the second section 532-B has a second thickness (T2) greater than the first thickness (T1). In some examples, the second thickness (T2) is more than 1x-3x of the first thickness (T1). In some examples, the first thickness is 0.7 mm and the second thickness is 1.5 mm. The second section 532-B is raised relative to the first section 532-A via a transition section 532-T. The transition section 532-T is curved, but may also be angular depending upon the design aesthetics of the portable electronic device 100. In some examples, an external surface of the second section 532-B is parallel or non-parallel to the external surface of the first section 532-A. In some examples, the back wall 530 is characterized as having a spline shape. The first section 532-A may be curved or contoured.

As illustrated in FIG. 5A, the portable electronic device 100 includes a first camera module 510-A and a second camera module 510-B. Notably, the first and second camera modules 510-A, B have thicknesses that exceed the thickness of the side wall 502. Accordingly, the first and second camera modules 510-A, B protrude beyond a distal end (or bottom surface) of the side walls 502. However, the second section 532-B of the back wall 530 has a thickness that is sufficient to hide the first and second camera modules 510-A, B within a cavity 506 of the portable electronic device 100. In particular, the side walls 502 and the second section 532-B of the back wall 530 have a combined thickness that exceeds the thicknesses of the first and second camera modules 510-A, B.

According to some embodiments, the first and second camera modules 510-A, B are carried by a chassis 528. In some examples, the chassis 528 is formed of stainless steel, titanium, or other metal sufficient to prevent and/or minimize bending during prolonged use of the portable electronic device 100. In particular, as the portable electronic device 100 is susceptible to being exposed to a drop event, the chassis 528 has sufficient stiffness to prevent the first and second camera modules 510-A, B from become misaligned relative to each other. As previously noted, the camera modules may be calibrated relative to each other. Moreover, the first and second camera modules 510-A, B are secured using a chassis insert 527. Notably, the chassis insert 527 has a low coefficient of linear thermal expansion (CTE) such as to prevent and/or minimize the chassis 528 from expanding when the portable electronic device 100 is exposed to heat. Beneficially, this low CTE also prevents and/or minimizes misalignment of the first and second camera modules 510-A upon exposure to heat. Additionally, the first and second camera modules 510-A, B are bonded with an epoxy to the chassis 528 and chassis insert 527. In some examples, the chassis insert 527 is formed of a high elastic modulus material (LCP) in order to minimize the deflection/misalignment from static forces when the first and second camera modules 510-A, B are assembled into the portable electronic device 100. In some examples, the chassis insert 527 has a higher stiffness amount than the epoxy.

The first camera module 510-A includes lens elements 514-A, a lens barrel 516-A, and a turret 512-A that houses the lens elements 514-A and the lens barrel 516-A. The second camera module 510-B includes lens elements 514-B, a lens barrel 516-B, and a turret 512-B that houses the lens elements 514-B and the lens barrel 516-B. The first and second camera modules 510-A, B are secured to a predetermined alignment and position using a brace structure 534. In particular, the first and second camera modules 510-A, B are carried by the brace structure 534. The brace structure 534 may be secured to a surface of the back wall 530 via an adhesive.

According to some embodiments, the portable electronic device 100 includes a first trim structure 522 (also referred to as an outer trim structure) and a second trim structure 524 (also referred to as an inner trim structure). The first and second trim structures 522, 524 are welded to each other to form a trim structure assembly and installed into the cavity 506 as a unit. When installed, the first trim structure 522 includes an overhang having an exterior surface that overlays at least a portion of the second section 532-B of the back wall 530 (when viewing the portable electronic device 100 with the back wall 530 facing up). In particular, the first trim structure 522 is press-fit against the second section 532-B.

The second trim structure 524 is also press-fit against the first trim structure 522. The second trim structure 524 has an external surface that is proud of the exterior surface of the overhang of the first trim structure 522. In particular, the exterior surface may be coated with a diamond-like carbon (DLC) coating that prevents abrasion marks from affecting the visual appearance of the second trim structure 524 while the external surface of the first trim structure 522 is coated with a metallic coating (e.g., anodized aluminum, etc.) or color-coated to match the color of the side walls 502. In some examples, the first trim structure 522 is formed of anodized aluminum. The second trim structure 525 may be formed of stainless steel. Beneficially, because the DLC coating is more abrasion-resistant than the metallic coating, the exterior surface of the second trim structure 524 being proud of the external surface minimizes and/or eliminates abrasion marks to the external surface such as when the portable electronic device 100 is being moved across a flat surface or object. In some examples, the DLC coating is 5×-10× more abrasion resistant than the metallic coating. Additionally, the DLC coating may have a black appearance so as to disguise the presence of the first and second camera modules 510-A, B as well as to minimize stray light reflection from entering the first and second camera modules 510-A, B.

According to some embodiments, the first and second trim structures 522, 524 are sealed with an O-ring 526. In some examples, multiple O-rings 526 are disposed throughout any interface between the back wall 530 and the first and second trim structures 522, 524 to prevent moisture ingress into the cavity 506. The brace structure 534 may be secured to the first and second trim structures 522, 524 via a welded washer (not illustrated), as described in greater detail with reference to FIGS. 7A-7B. In some embodiments, the external surface of the turrets 512-A, B are coplanar to the exterior surface of the second trim structure 524. It should be noted that the portable electronic device 100 may utilize a single trim structure or multiple trim structures. Furthermore, FIG. 5A illustrates sets of second trim structures 524 disposed at opposing ends of the raised portion of the back wall 530—e.g., the raised portion 370. These second trim structures 524 affix the first and second camera modules 510-A, B. Additionally, these second trim structures 524 may have external surface with uniform heights that are proud of the exterior surface of the overhangs of the first trim structure 522.

In particular, FIG. 5B illustrates a cross-sectional view 500-B of a camera assembly taken along the B-B cross-section of the portable electronic device 100 of FIG. 1B. The portable electronic device 100 includes an enclosure defined by side walls 502 and a back wall 530. In particular, the side walls 502 include metal bands 504 that are secured to the back wall 530. In some instances, the metal bands 504 are secured to the back wall 530 via at least one of an adhesive, a fastener or a weld. The side walls 502 carry a trim structure (not illustrated) that supports a protective cover 504. In some examples, the protective cover 504 overlays a display assembly.

Unlike the A-A cross-section of the camera assembly 160 of the portable electronic device 100 as illustrated in FIG. 5A, the B-B cross-section of the camera assembly 160 illustrates a single camera module. FIG. 5B illustrates that the cross-sectional view 500-B of the camera assembly 160 includes a third camera module 510-C. The third camera module 510-C includes lens elements 514-C, a lens barrel 516-C, and a turret 512-C that houses the lens elements 514-C and the lens barrel 516-C. The third camera module 510-C is aligned relative to the first and second camera modules 510-A, B in a triangular orientation. The third camera module 510-C is biased in a predetermined position using the brace structure 534.

Additionally, the cross-sectional view 500-B illustrates a strobe module 570 that is disposed through an opening in the thickness of the second section 532-B of the back wall 530. In some examples, an opening 572 is formed within the second section 532-B. The strobe module 570 is disposed within the opening 572. When viewing the portable electronic device 100 with the protective cover 504 facing up, an IR emitter and detection module 580 overlays the strobe module 570. The IR emitter and detection module 580 may be carried by the support plate 550. The opening 572 may have a circular hole that is defined by opposing edges of the second section 532-B of the back wall 530. The strobe module 570 is hermetically sealed relative to the opposing edges with an O-ring 526. The brace structure 534 includes an opening for the strobe module 570 that is aligned with the opening 572 in the second section 532-B. When installed, the strobe module 570 is overlaid by the support plate 550 and the brace structure 534 when viewing the portable electronic device 100 with the protective cover 504 facing up. Due to positioning the IR emitter and detection module 580 above the strobe module 570, the strobe module 570 cannot be too large in the Z-direction. Beneficially, the plateau of the back wall 530 enables the strobe module 570 and the IR emitter and detection module 580 to be fit along the same Z-direction.

Additionally, the cross-sectional view 500-B illustrates a microphone module 560 carried within the cavity 506. The microphone module 560 includes a detection component 562 disposed through a thickness of the second section 532-B of the back wall 530. The second section 532-B includes an opening 574 for the detection component 562. In some examples, the brace structure 534 carries the microphone 560 in a predetermined location. The brace structure 534 includes an opening for the microphone module 560 that is aligned with the opening 574 in the second section 532-B.

FIGS. 6A-6B illustrate cross-sectional views of a portable electronic device, according to some embodiments. In particular, FIG. 6A illustrates a cross-sectional view 600 of the portable electronic device 200 taken along the C-C cross-section of FIG. 2. Similar to FIGS. 5A-5B, the portable electronic device 200 includes an enclosure defined by side walls and a back wall 630. In particular, the side walls include metal bands that are secured to the back wall 630. In some instances, the metal bands are secured to the back wall 630 via at least one of an adhesive, a fastener or a weld. FIG. 6B illustrates that the portable electronic device 200 includes the back wall 630 having a first section 632-A and a second section 632-B that is raised relative to the first section 632-A. As illustrated in FIG. 6A, the portable electronic device 200 includes a first camera module 610-A and a second camera module 610-B. The first and second camera modules 610-A, B are carried by a brace structure 634.

The first camera module 610-A includes a lens elements 614-A and a lens barrel 616-A. The second camera module 610-B includes a lens element 614-B and a lens barrel 616-B. The first and second camera modules 610-A, B are coupled to a chassis 628. Beneficially, the chassis 628 maintains the first and second camera modules 610-A, B in orientation to the strobe module 164.

According to some embodiments, the first and second camera modules 610-A, B are carried by the chassis 628. The chassis 628 is formed of stainless steel, titanium, or other metal sufficient to prevent and/or minimize bending during prolonged use of the portable electronic device 200. Moreover, the first and second camera modules 610-A, B are secured using a chassis insert 625. Notably, the chassis insert 625 has a low coefficient of linear thermal expansion (CTE) such as to prevent and/or minimize the chassis 628 from expanding when the portable electronic device 200 is exposed to heat. Beneficially, this low CTE also prevents and/or minimizes misalignment of the first and second camera modules 610-A upon exposure to heat. Additionally, the first and second camera modules 610-A, B are bonded with an epoxy to the chassis 628 and chassis insert 625. In some examples, the chassis insert 625 is formed of a high elastic modulus material (LCP). Use of the high elastic modulus material minimizes deflection/misalignment from static forces when assembling the first and second camera modules 610-A, B into the portable electronic device 200. FIG. 6A illustrates that the combination of the epoxy and chassis insert 625 enables near orthogonal alignment between a normal of the first and second camera modules 610-A, B and a protective cover 604 of the portable electronic device 200.

As illustrated in FIG. 6B, the portable electronic device 200 includes first and second trim structures 622, 624 that are sealed with an O-ring 626. The first and second trim structures 622, 624 are mounted between the back wall 630 and the first camera module 610-A. The back wall 630 may also be referred to as a protective cover or glass cover. It should be noted that in other embodiments, the portable electronic device 20 may include only a single trim structure—e.g., only the first trim structure 622—that is mounted between the back wall 630 and the first camera module 610-A. Notably, the back wall 630 includes a first section 632-A and a second section 632-B that is raised relative to the first section 632-A. The first section 632-A has a first thickness and the second section 632-B has a second thickness greater than the first thickness. A brace structure 634 may be secured to the first and second trim structures 622, 624 via a welded washer (not illustrated).

Figure 7A:
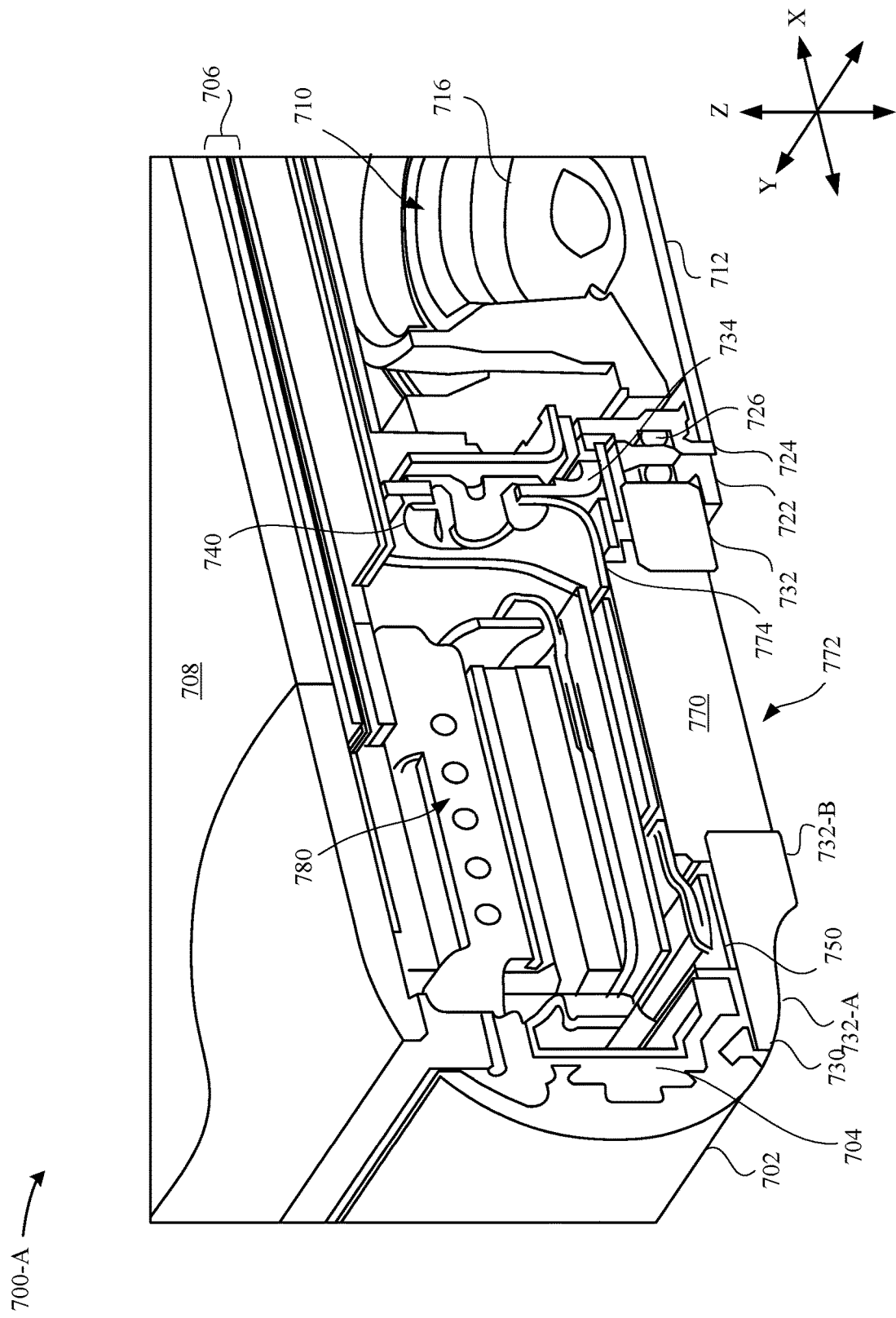
FIGS. 7A-7B illustrate various perspective views of a portable electronic device, according to some embodiments.
Figure 7B:
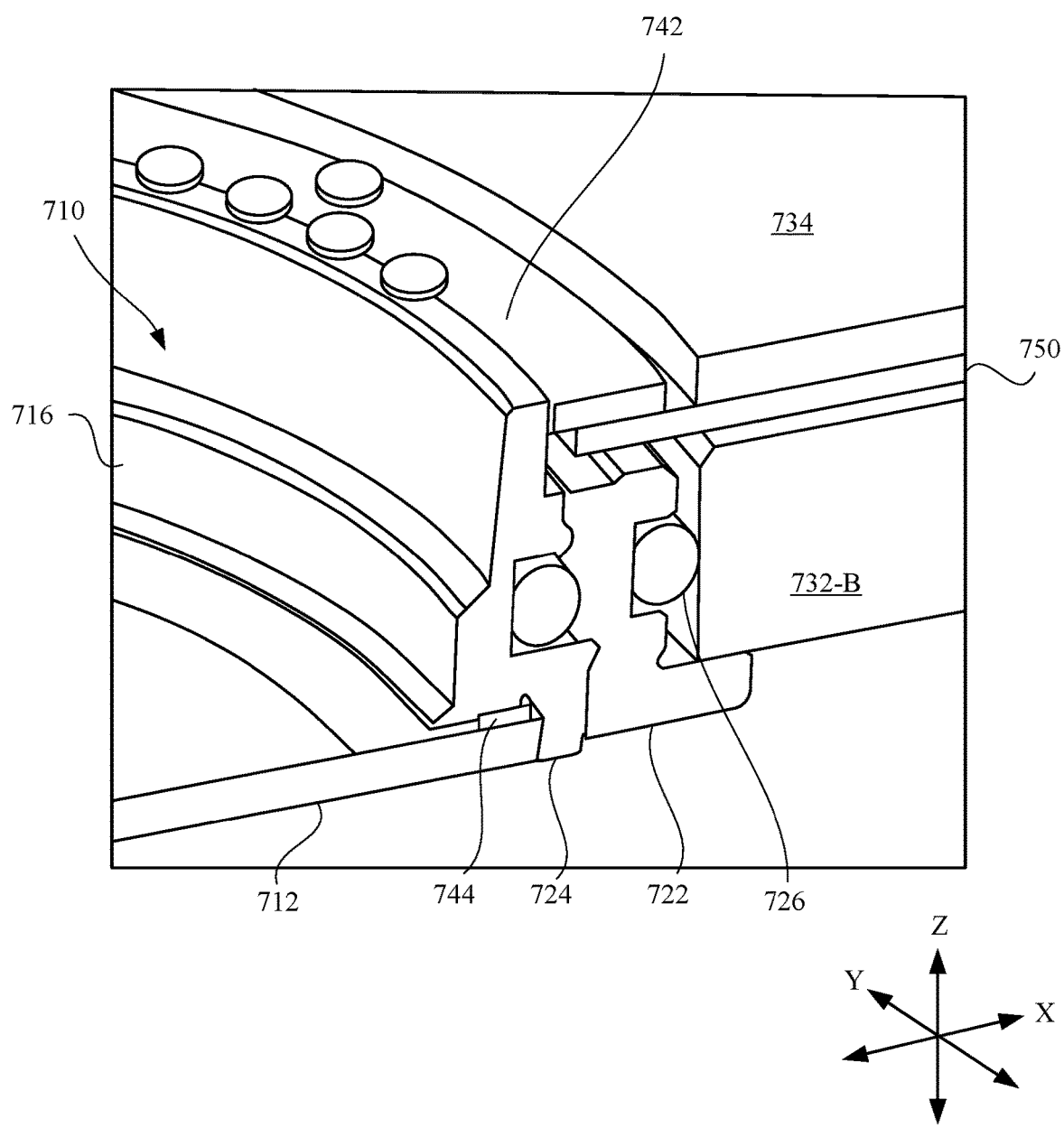

FIGS. 7A-7B illustrate various perspective views of a portable electronic device, according to some embodiments. As will be described in greater detail with reference to FIGS. 7A-7B, the use of a weld washer enables different types of trim structures to be implemented into the enclosures of the portable electronic devices 100, 200. Indeed, the weld washer allows different combinations of trim structures to be mounted relative to the back wall—e.g., the back wall 130—while allowing for assembly tolerance.

FIG. 7A illustrates a perspective, cross-sectional view 700-A of the portable electronic device 100, according to some embodiments. The portable electronic device 100 includes an enclosure defined by side walls 702 and a back wall 730. Together, the side walls 702 and the back wall 730 define a cavity capable of carrying operational components therein. The side walls 702 include metal bands 704, where the metal bands 704 are secured to the back wall 730 via at least one of an adhesive, a fastener or a weld. The side walls 702 include a trim structure that carries a protective cover 708. The protective cover 708 overlays a display assembly 706. The display assembly 706 includes thin films such as a light-emitting diode (LED) layer.

As previously described herein, the back wall 730 include a first section 732-A and a second section 732-B. The second section 732-B is raised relative to the first section 732-A so that the second section 732-B has a second thickness (T2) greater than a first thickness (T1) of the first section 732-A.

The portable electronic device 100 includes a camera module 710 disposed within the cavity. The camera module 710 includes a lens barrel 716 and a turret 712. The camera module 710 is carried by a brace structure 734. As illustrated in FIG. 7A, the brace structure 734 has an L-shape. Notably, the L-shape enables a welded washer to fit within the opening defined by the L-shape. In some examples, the welded washer is sized to fit within a thickness of the L-shape.

The portable electronic device 100 includes a strobe module 770. The strobe module 770 is supported by a strobe cowling 774. The strobe cowling 774 includes a cowling welded nut 740 so that the strobe cowling 774 is secured to the brace structure 734. As illustrated in FIG. 7A, the strobe module 770 is fitted through an opening 772 disposed between opposing edges of the second section 732-B. A first trim structure 722 has an overhang that overlays a portion of the second section 732-B (when viewing the portable electronic device 100 with the back wall 730 facing up). A second trim structure 724 has an exterior surface that is proud of the external surface of the overhang of the first trim structure 722 (when viewing the portable electronic device 100 with the back wall 730 facing up). The first and second trim structures 722, 724 are welded together and hermetically isolated from each other with an O-ring 726.

As illustrated in FIG. 7A, an IR emitter and detection module 780 overlays the strobe module 770 (when viewing the portable electronic device 100 with the protective cover 708 facing up). Additionally, the IR emitter and detection module 780 is supported by a support plate 750.

As illustrated in FIG. 7A, the turret 712 of the camera module 710 is slightly proud of the second section 732-B (also referred to as a plateau) of the back wall 730. The first and second trim structures 722, 724 help to accommodate for the presence of the dimensions of the camera module 710. It should be noted that without the plateau of the back wall 730, the portable electronic device 100 would require a much taller trim structure(s) in order to accommodate for the camera module. A taller trim structure(s) would make the portable electronic device heavier and bulkier. Instead implementing a plateau with a thicker back wall 730 in sections of the portable electronic device 100 that carry an electronic component (e.g., camera module, strobe module, etc.) enables for smaller trim structures to be utilized. Indeed, one of ordinary skill in the art would have understood that a taller trim structure would be more complicated to manufacture and assemble relative to the other support structures of the portable electronic device.

FIG. 7B illustrates a perspective, cross-sectional view 700-B of the portable electronic device 100, according to some embodiments. The portable electronic device 100 includes the camera module 710 having a lens barrel 716 and a turret 712. The turret 712 is secured in position using the first and second trim structures 722, 724. The second trim structure 724 is secured to a portion of the turret 712 via an adhesive 744. Additionally, the first and second trim structures 722, 724 are hermetically sealed from each other and the second section 732-B of the back wall 730 via O-ring 726.

FIG. 7B illustrates a support plate 750 is glued to a surface of the second section 732-B of the back wall 730. Overlaying the support plate 750 is a brace structure 734. Adjacent to the brace structure 734 is a welded washer 742. Notably, the thickness of the welded washer 742 is less than a thickness of the brace structure 734. During the manufacturing process, the first and second trim structures 722, 724 are installed together. Thereafter, the brace structure 734 is assembled within the cavity of the portable electronic device 100 and joined to the first and second trim structures 722, 724. Subsequently, the welded washer 742 is used to weld the second trim structure 724 to the brace structure 734. Beneficially, the use of the welded washer 742 enables different types of trim structures to be implemented in the portable electronic devices 100, 200 that carry three camera modules and two camera modules, respectively. Although FIGS. 7A-7B are directed towards the portable electronic device 100, the back wall 730 having the first and second sections 732-A, B may be interchangeably used with the portable electronic device 200. The welded washer 742 allows for assembly tolerance by enabling the first and second trim structures 722, 724 to be mounted in an approximate position. The welded washer 742 allows for tight clearance between the first and second trim structures 722, 724. The welded washer 742 will locate relative to variations of the different trim structures in the X-direction and the Y-direction while the welded washer 742 floats in the Z-direction. Moreover, especially where the portable electronic device 100 includes multiple trim structures, the welded washer 742 prevents the second trim structure 724 from crashing against the brace structure 734. Without the welded washer 742, it would be necessary to increase the gap between the brace structure 734 and the second trim structure 724.

Figure 8A:
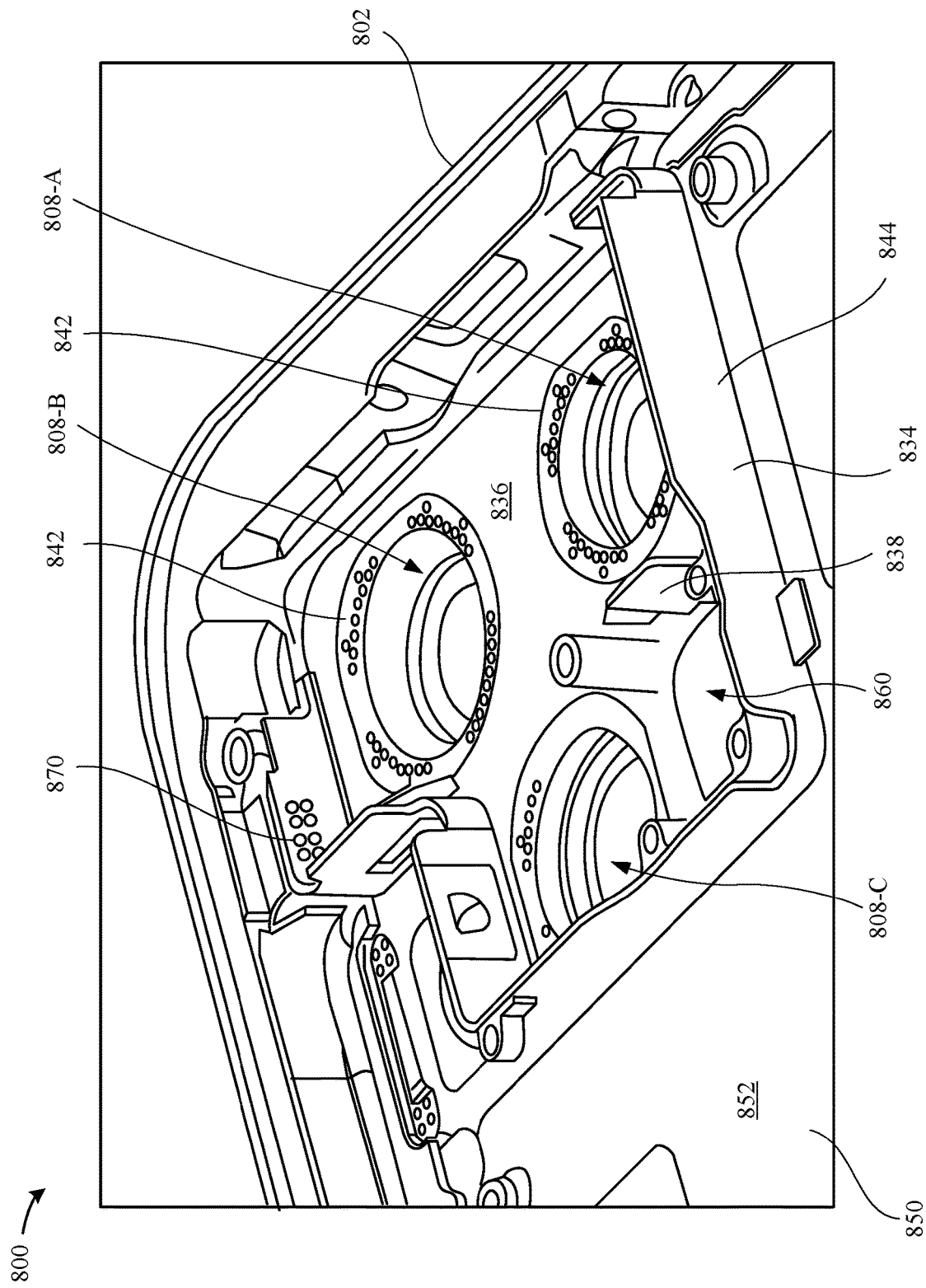
FIGS. 8A-8D illustrate various perspective views of operational components of a portable electronic device, according to some embodiments.

FIGS. 8A-8D illustrate various perspective views of operational components of a portable electronic device 800, according to some embodiments. Although described with reference to the portable electronic device 100, it should also be noted that the support structures and operational components described herein may apply to the embodiments shown in the portable electronic device 200. FIG. 8A illustrates a perspective view of the portable electronic device 800 that includes an enclosure having side walls 802 that define a cavity. A support plate 850 is disposed within the cavity and secured to metal bands of the side walls 802. The support plate 850 carries a brace structure 834 that is mounted on top of a base 852 of the support plate 850.

According to some embodiments, the brace structure 834 includes a floor 836 with openings 808-A, B, C formed within the floor 836 that are sized and aligned relative to the first, second, and third camera modules—e.g., 162-A, B, C, respectively. Each of the openings 808-A, B, C are surrounded by a weld washer 842.

In particular, the brace structure 834 includes ground/biasing springs 870 that are capable of engaging the camera modules into a known position against walls 844 of the brace structure 834. Additionally, the ground/biasing springs 870 also ground the camera modules. In some examples, the ground/biasing springs 870 function as known datums that bias the camera modules into an exact alignment with the openings in the support plate 850 and the back wall—e.g., the back wall 730. Beneficially, the ground/biasing springs 870 ensure that the apertures of the camera modules are centered and aligned. Indeed, the camera modules may be electronically calibrated using software prior to being installed into the brace structure 834. Thus, it is critical that the apertures of the camera modules are aligned. Indeed, misaligned apertures may cause photographic vignetting.

The brace structure 834 also includes an opening 860 disposed within the floor 836 that enables a microphone module—e.g., the microphone module 560—to be aligned with openings in the support plate 850 and the back wall—e.g., the back wall 730. The brace structure 834 includes a tab 838 for biasing the microphone module against walls of the brace structure 834.

Figure 8B:
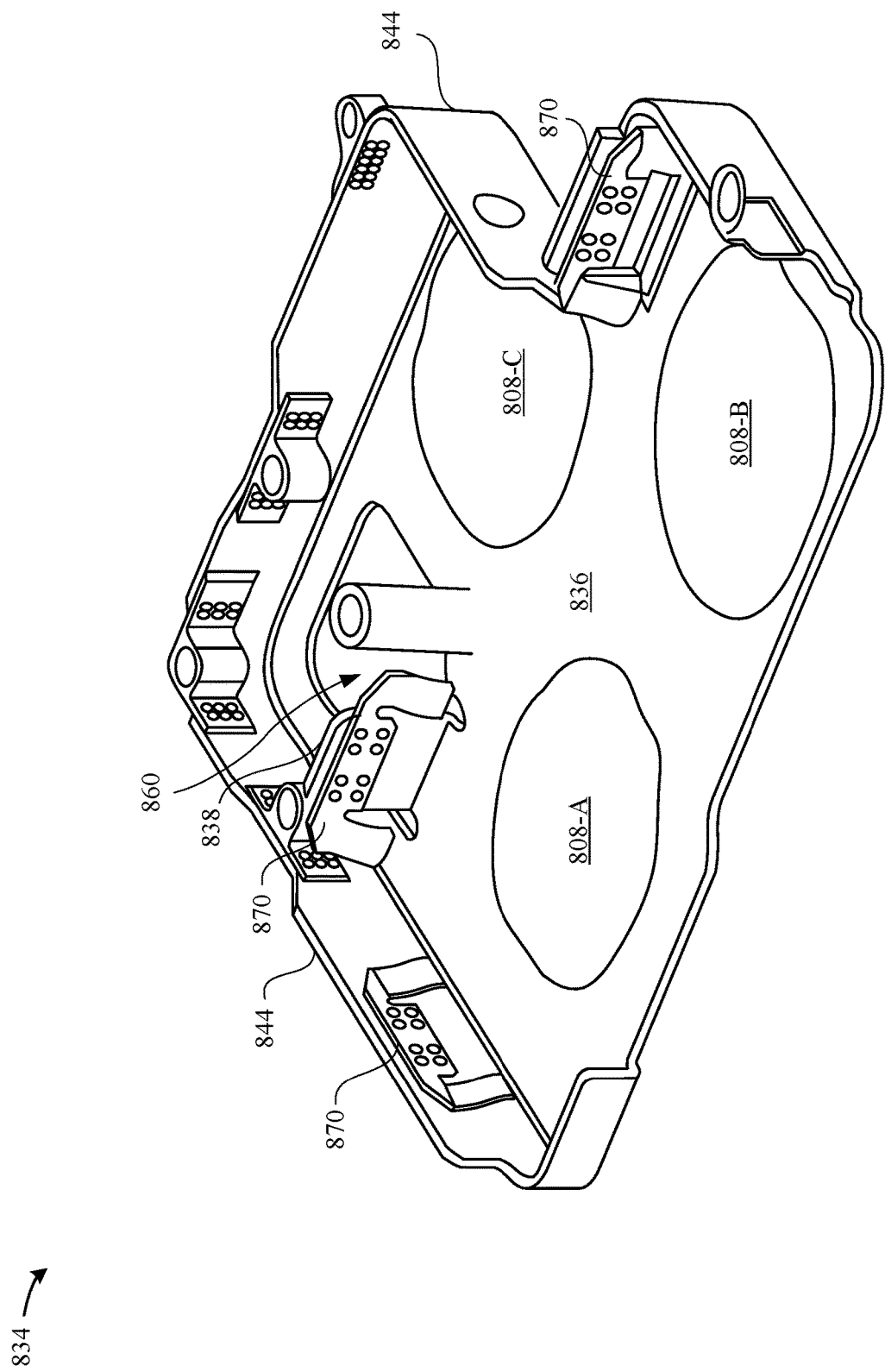

FIG. 8B illustrates a perspective view of the brace structure 834, according to some embodiments. The brace structure 834 includes openings 808-A, B, C for the camera modules—e.g., the first, second, and third camera modules 510-A, B, C. The brace structure 834 includes ground/biasing springs 870 that engage the camera modules into a known position against the walls 844. Each of the openings 808-A, B, C are surrounded by a weld washer 842. Indeed, the walls 844 of the brace structure 834 have a height that permits for clearance for the weld washer 842. The weld washer 842 can fit within the height of the walls 844. Indeed, it would be undesirable to have the weld washer 842 extend beyond the height of the walls 844.

Figure 8C:
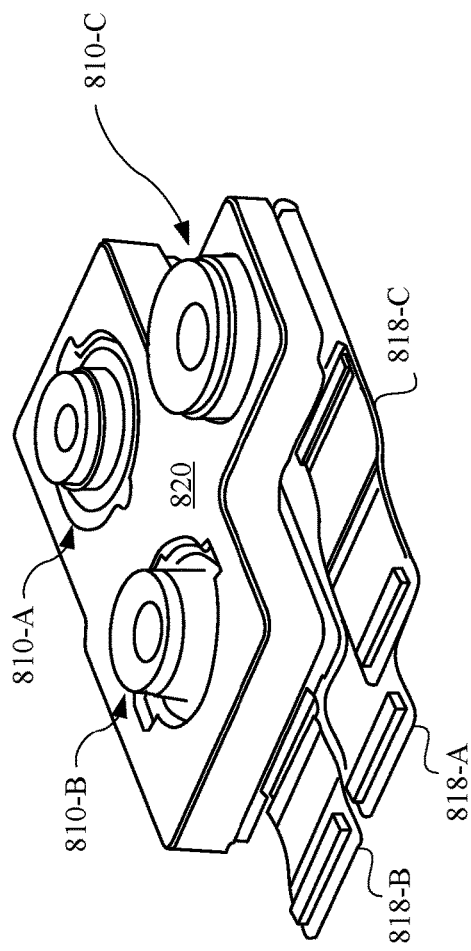

FIG. 8C illustrates a top perspective view of a camera module assembly 810, according to some embodiments. In particular, the camera module assembly 810 includes first, second, and third camera modules 810-A, B, C. Each of the first, second, and third camera modules 810-A, B, C include a respective turret so that when the first, second, and third camera modules 810-A, B, C are carried by the brace structure 834, the turrets are proud of the distal end of the brace structure 834. The first, second, and third camera modules 810-A, B, C are carried within a chassis 820. The chassis 820 mounts onto the floor 836 of the brace structure 834. The ground/biasing springs 870 bias the chassis 820 and the camera module assembly 810 into a predetermined position.

Figure 8D:
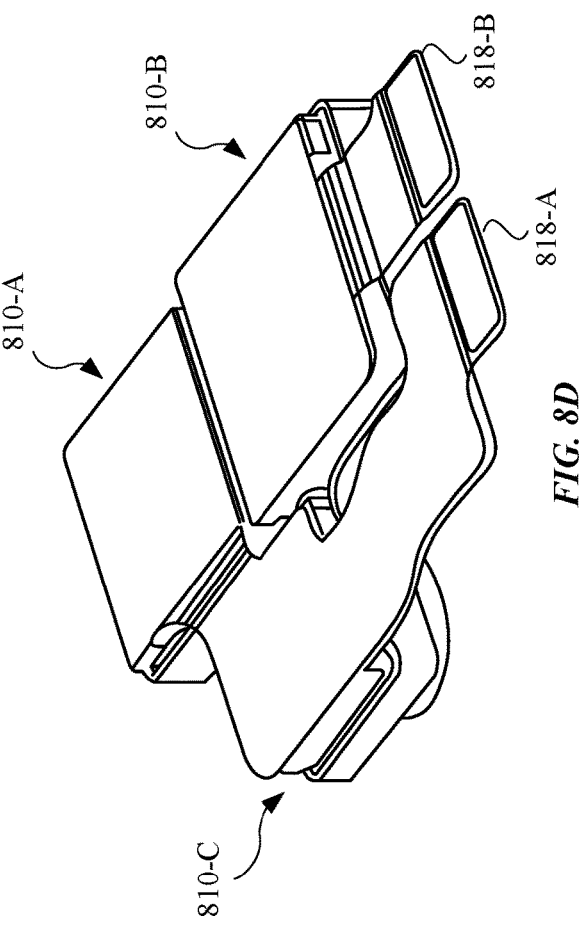

FIG. 8D illustrates a bottom perspective view of a camera module assembly 810, according to some embodiments. Each of the first, second, and third camera modules 810-A, B, C include a flex cable that causes electrical signals to be transmitted to/from a logic board of the portable electronic device 800. The first camera module 810-A is electrically coupled to a first flex cable 818-A, the second camera module 810-B is electrically coupled to a second flex cable 818-B, and the third camera module 810-C is electrically coupled to a third flex cable (not illustrated).

FIGS. 9A-9B illustrate various perspective views of operational components of a portable electronic device, according to some embodiments. FIG. 9A illustrates a perspective view of a chassis 900 for carrying a camera module assembly—e.g., the camera module assembly 260—of the portable electronic device 200. The chassis 900 includes a floor 926 having openings 908-A, B that are aligned for the first and second camera modules 910-A, B. In particular turrets of the first and second camera modules 910-A, B can fit through the openings 908-A, B. The chassis 900 also includes a chassis insert 928 that provide additional stiffening for the chassis 900. The chassis 900 includes walls 944.

FIG. 9B illustrates a perspective view of a camera module assembly 910, according to some embodiments. The camera module assembly 910 is capable of being received within the chassis 900. The camera module assembly 910 includes first and second camera modules 910-A, B. The first camera module 910-A includes an integrated circuit 916-A and a flex circuit 918-A for transmitting/receiving signals from a logic board. The second camera module 910-B includes an integrated circuit 916-B and a flex circuit 918-B for transmitting/receiving signals from a logic board.

Figure 10:
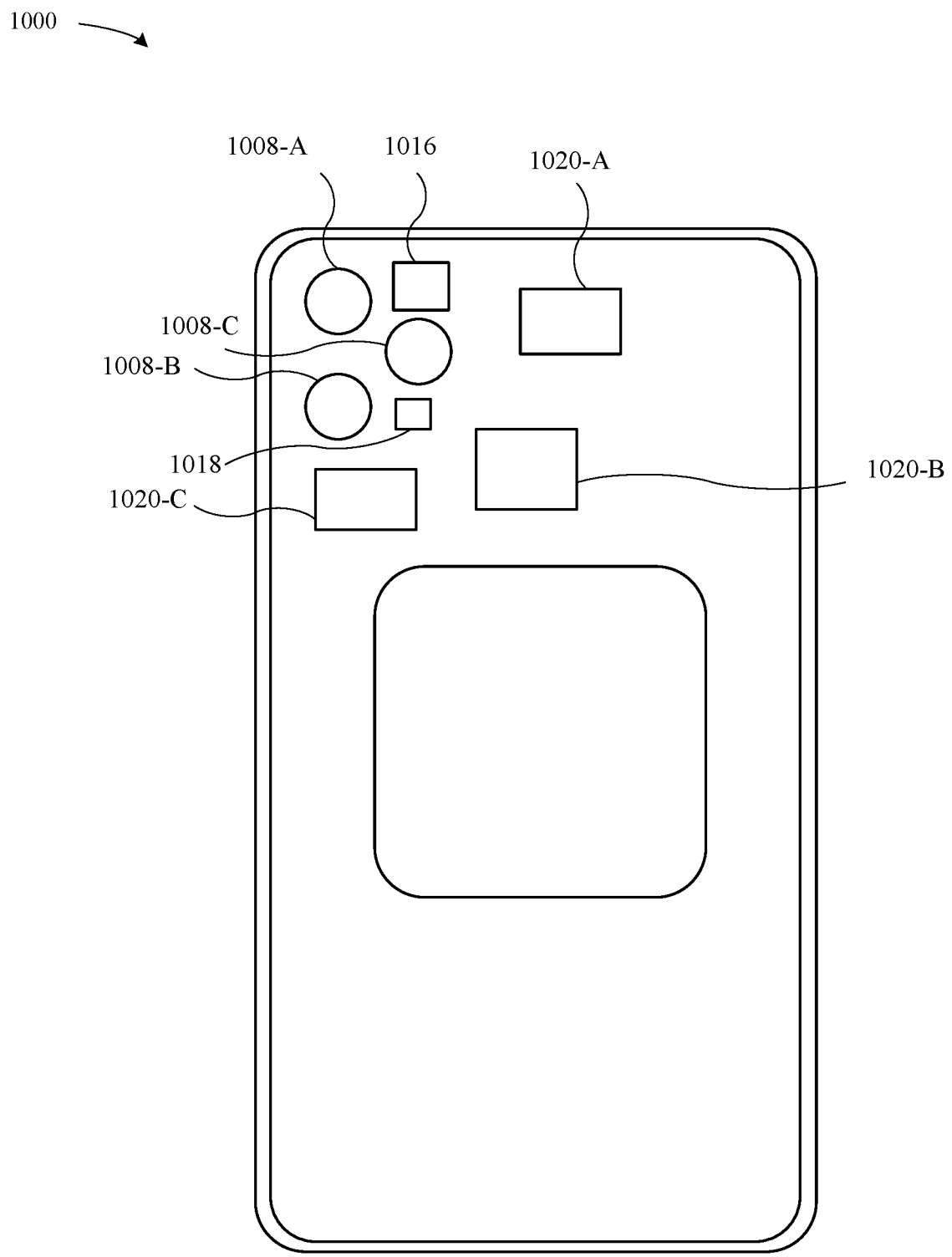
FIG. 10 illustrates a top view of an operational component of a portable electronic device, according to some embodiments.

FIG. 10 illustrates a top view of an operational component of a portable electronic device, according to some embodiments. In particular, FIG. 10 illustrates a support plate 1000 that may correspond to the support plate 450, as described with reference to FIG. 4. The support plate 1000 includes several openings for wireless antenna and camera modules. In particular, the support plate 1000 includes an opening 1008-A capable that allows a first camera module—e.g., the first camera module 510-A to pass therethrough. The support plate 1000 includes an opening 1008-B capable that allows a second camera module—e.g., the second camera module 510-B to pass therethrough. The support plate 1000 includes an opening 1008-C capable of allowing a third camera module—e.g., the third camera module 510-C to pass therethrough. The support plate 1000 includes a strobe module opening 1016 to allow a strobe module—e.g., the strobe module 570 to pass therethrough. The support plate 1000 includes a microphone opening 1018 to allow a microphone module—e.g., the microphone module 560 to pass therethrough. The support plate 1000 further includes openings 1020-A, B, C to enable wireless antenna modules to pass therethrough. In some examples, the wireless antenna modules are ultra-wideband antennas. Beneficially, the portable electronic device 100 or 200 may utilize the ultra-wideband antennas to communicate with other devices having an ultra-wideband antenna in order to execute functions. Ultra-wideband antennas can utilize a low amount of energy for short-range, high-bandwidth communications.

Notably, the support plate 1000 may be formed from a metal material (e.g., stainless steel). Accordingly, openings are cut out of the support plate 1000 to prevent electromagnetic interference.

Figure 11:
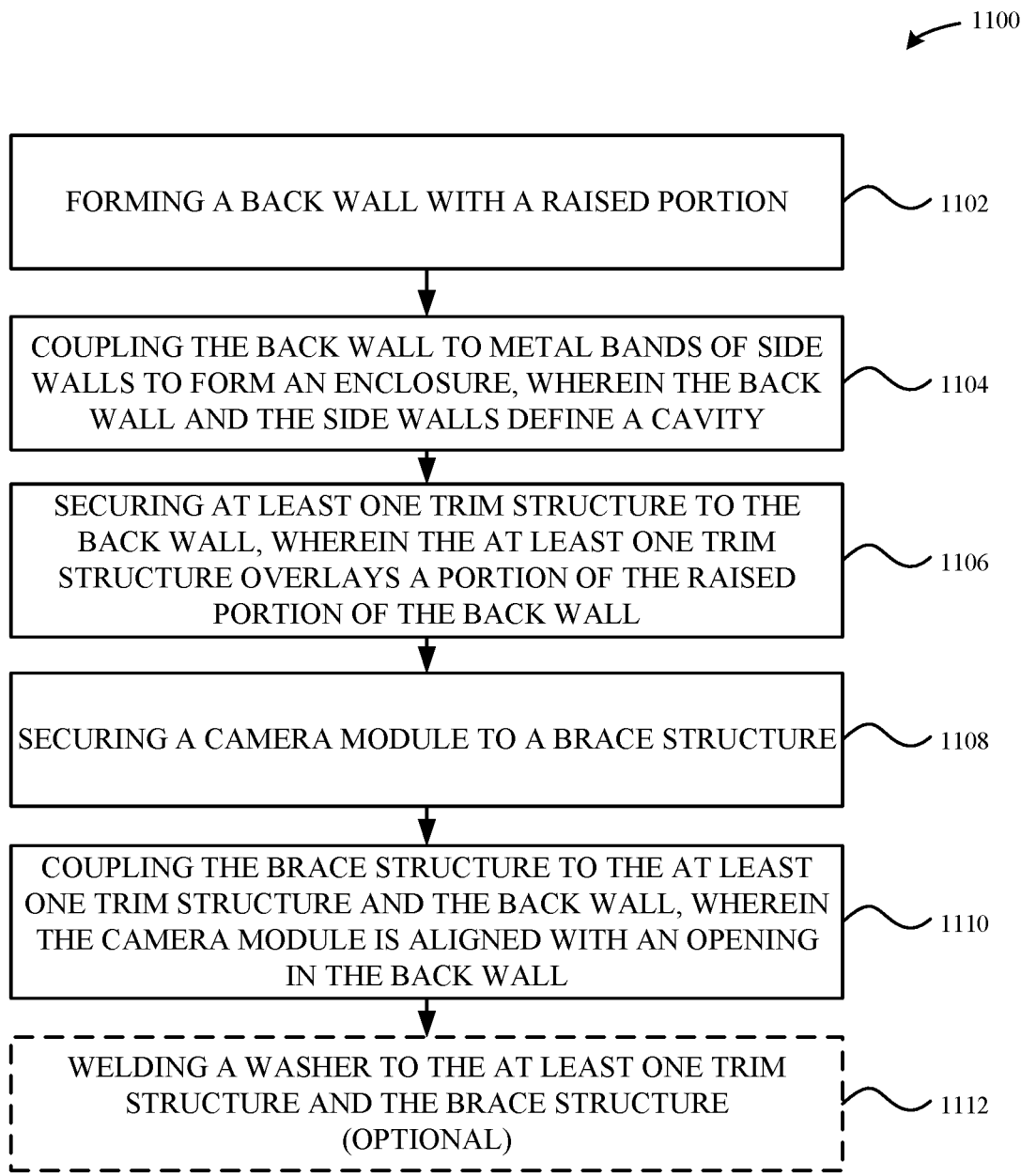
FIG. 11 illustrates a method for forming a portable electronic device, according to some embodiments.

FIG. 11 illustrates a method 1100 for forming a portable electronic device, according to some embodiments. The method 1100 begins at step 1102 by forming a back wall—e.g., the back wall 530—with a raised portion (plateau portion). In some embodiments, the back wall 530 includes a first section 532-A and a second section 532-B that is raised relative to the first section 532-A. In some examples, the raised portion is formed by a machining process that involves machining a portion of the glass of the back wall 530. In some examples, an opening is formed within the raised portion, where the opening is capable of receiving a turret of a camera module—e.g., the first camera module 510-A.

At step 1104, the back wall 530 is coupled to metal bands—e.g., the metal bands 504 of the side walls 502. As a result, the back wall 530 and the side walls 502 define a cavity 506 capable of having operational components disposed therein.

At step 1106, at least one trim structure—e.g., the first trim structure 522 or the second trim structure 524 is secured to the back wall 530. In some examples, the at least one trim structure is press fit against a surface of the back wall 530. The at least one trim structure overlays a portion of the raised portion of the back wall 530.

At step 1108, a camera module—e.g., the first camera module 510-A—is secured to a brace structure 534. At step 1110, the brace structure 534 that carries the camera module is coupled to the at least one trim structure and the back wall 530. The camera module is aligned with an opening in the back wall 530.

At step 1112, a weld washer—e.g., the welded washer 742 is welded to the at least one trim structure and the brace structure 534.

Figure 12:
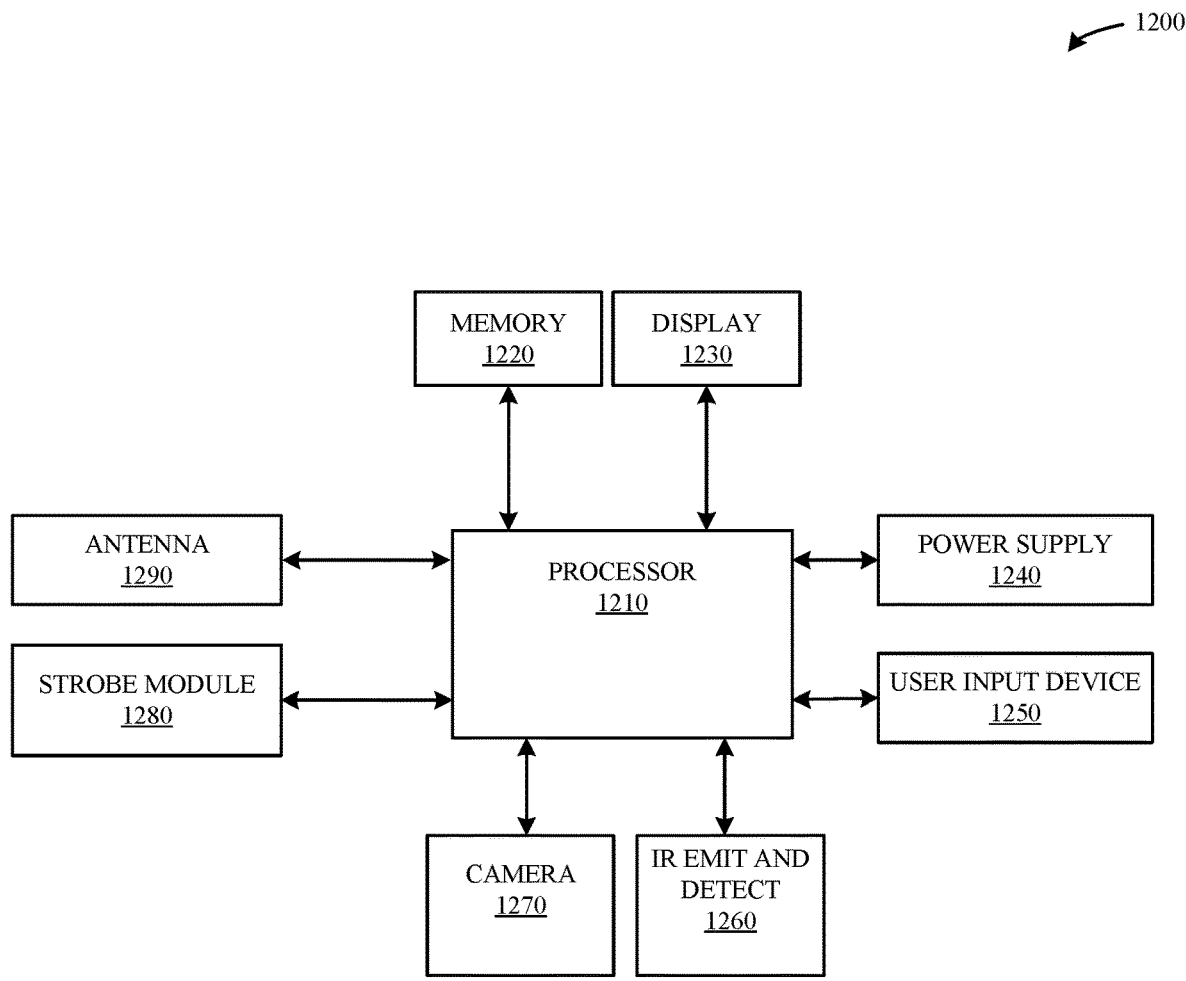
FIG. 12 illustrates a system diagram of a portable electronic device, according to some embodiments.

FIG. 12 illustrates a system diagram of a portable electronic device capable of implementing the various techniques described herein, according to some embodiments. In particular, the detailed view illustrates various components that can be included in the portable electronic devices 100, 200.

As shown in FIG. 12, the portable electronic device 1200 includes a processor 1210 for controlling the overall operation of the portable electronic device 1200. The portable electronic device 1200 can include a display 1230. The display 1230 can be a touch screen panel that can include a sensor (e.g., capacitance sensor). The display 1230 can be controlled by the processor 1210 to display information to the user. A data bus can facilitate data transfer between at least one memory 1220 and the processor 1210. The portable electronic device 800 can also include a network/bus interface that couples a wireless antenna 1290 to the processor 1210. The portable electronic device 1200 also includes a memory 1220, which can comprise a single disk or multiple disks (e.g., hard drives), and includes a storage management module that manages one or more partitions within the memory 1220. In some embodiments, the memory 1220 can include flash memory, semiconductor (solid state) memory or the like. The portable electronic device 1200 can also include a Random Access Memory (RAM) and a Read-Only Memory (ROM). The ROM can store programs, utilities or processes to be executed in a non-volatile manner. The RAM can provide volatile data storage, and stores instructions related to the operation of the portable electronic device 1200.

The portable electronic device 1200 may include a user input device 1250, such as a switch or a touch screen panel. The portable electronic device 1200 includes a power supply unit 1240, such as a lithium-ion battery.

The portable electronic device 1200 may include an IR emitter and detection module 1260, a camera 1270, and a strobe module 1280.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

Any ranges cited herein are inclusive. The terms "substantially", "generally," and "about" used herein are used to describe and account for small fluctuations. For example, they can refer to less than or equal to ±5%, such as less than or equal to ±2%, such as less than or equal to ±1%, such as less than or equal to ±0.5%, such as less than or equal to ±0.1%.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A portable electronic device comprising:
a housing member defining an external sidewall;
a first glass cover and a second glass cover, wherein the second glass cover includes:
 a first region having a first exterior surface,
 a second region having a second exterior surface vertically displaced from the first exterior surface, wherein the second region includes a first opening, a second opening, and a third opening, and
 a transition region having an exterior surface that extends between the first exterior surface to the second exterior surface;
a first camera module disposed within the first opening;
a second camera module disposed within the second opening;
a strobe module disposed within the third opening; and
a trim structure having an edge that overlays the second region of the second glass cover.

2. The portable electronic device of claim 1, further comprising:
a display layer having a notch, wherein the display layer is overlaid by the first glass cover.

3. The portable electronic device of claim 2, further comprising:
an infrared (IR) light detector and an IR light emitter that are disposed within the notch of the display layer.

4. The portable electronic device of claim 1, wherein the first exterior surface of the first region is textured.

5. The portable electronic device of claim 1, wherein the second exterior surface of the second region is textured.

6. The portable electronic device of claim 1, wherein the edge of the trim structure extends proud of the first camera module.

7. The portable electronic device of claim 1, wherein the exterior surface of the transition region is textured.

* * * * *